United States Patent
Boutelle et al.

(10) Patent No.: US 12,033,175 B2
(45) Date of Patent: Jul. 9, 2024

(54) METHODS AND SYSTEMS FOR REGULATING OPERATION OF UNITS USING ENCRYPTION TECHNIQUES ASSOCIATED WITH A BLOCKCHAIN

(71) Applicant: Fidelity National Information Services, Inc., Jacksonville, FL (US)

(72) Inventors: Cassie Boutelle, Sarasota, FL (US); Lou Grilli, Tampa, FL (US); Troy Land, Tampa, FL (US); James Heystek, St. Petersburg, FL (US); Wade D. Murray, Hoboken, NJ (US)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

(21) Appl. No.: 16/740,772

(22) Filed: Jan. 13, 2020

(65) Prior Publication Data

US 2020/0184504 A1 Jun. 11, 2020

Related U.S. Application Data

(63) Continuation of application No. 15/178,279, filed on Jun. 9, 2016, now Pat. No. 10,558,996.

(Continued)

(51) Int. Cl.
*G06Q 30/00* (2023.01)
*G06Q 30/0211* (2023.01)
(Continued)

(52) U.S. Cl.
CPC ..... *G06Q 30/0229* (2013.01); *G06Q 30/0211* (2013.01); *H04L 9/3236* (2013.01);
(Continued)

(58) Field of Classification Search
CPC ............ G06Q 30/0229; G06Q 30/0211; G06Q 2220/00; H04L 2209/38; H04L 2209/56; H04L 9/3236
See application file for complete search history.

(56) References Cited

U.S. PATENT DOCUMENTS 8,046,256 B2 * 10/2011 Chien ................ G06Q 30/0233
705/14.33
8,229,859 B2 * 7/2012 Samid .................. G06Q 20/223
705/69

(Continued)

FOREIGN PATENT DOCUMENTS

AU 2021100984 A4 * 4/2021
EP 908810 A2 * 4/1999 ......... G06F 12/1408

(Continued)

OTHER PUBLICATIONS

"Bitcoin: Technical Background and Data Analysis", by Anton Badev et al. Finance and Economics Discussion Series. Division of Research & Statistics and Monetary Affairs. Federal Reserve Board, Washington, D.C. Oct. 7, 2014. (Year: 2014).*

(Continued)

*Primary Examiner* — James A Reagan
(74) *Attorney, Agent, or Firm* — Finnegan, Henderson, Farabow, Garrett & Dunner LLP

(57) ABSTRACT

Methods and systems for regulating generation of units according to at least one encryption technique associated with a blockchain are disclosed. In some embodiments, a system includes a communication device configured to communicate with a computing device executing an application and a processor configured to execute instructions to perform operations. The operations include receiving transaction information describing a transaction; based on the transaction, determining product awards for at least one product awards program for the transaction; using the block- (Continued)

chain, determining a real-time conversion rate for the transaction, where the real-time conversion rate is regulated by the at least one encryption technique; based on the real-time conversion rate, converting the product awards to units; and entering into the blockchain encrypted data associated with the transaction, wherein the encrypted data is encrypted according to the at least one encryption technique.

21 Claims, 29 Drawing Sheets

Related U.S. Application Data

(60) Provisional application No. 62/173,296, filed on Jun. 9, 2015.

(51) Int. Cl.
  *G06Q 30/0226* (2023.01)
  *H04L 9/32* (2006.01)
  *H04L 9/00* (2022.01)

(52) U.S. Cl.
  CPC ............ *G06Q 2220/00* (2013.01); *H04L 9/50* (2022.05); *H04L 2209/56* (2013.01)

(56) References Cited

U.S. PATENT DOCUMENTS

| | | | | |
|---|---|---|---|---|
| 8,712,914 | B2* | 4/2014 | Lyons | G06Q 20/065 705/44 |
| 9,892,460 | B1* | 2/2018 | Winklevoss | G06Q 40/04 |
| 9,965,804 | B1* | 5/2018 | Winklevoss | G06Q 40/04 |
| 10,068,228 | B1* | 9/2018 | Winklevoss | H04L 9/085 |
| 10,269,009 | B1* | 4/2019 | Winklevoss | G06Q 20/3674 |
| 10,878,389 | B2* | 12/2020 | Shtylman | G06Q 20/388 |
| 2002/0143614 | A1* | 10/2002 | MacLean | G06Q 30/0227 705/14.28 |
| 2004/0181453 | A1* | 9/2004 | Ray | G07F 7/1008 705/16 |
| 2007/0117615 | A1* | 5/2007 | Van Luchene | A63F 13/75 463/25 |
| 2007/0219869 | A1* | 9/2007 | Haines | G06Q 30/0207 705/26.1 |
| 2008/0120221 | A1* | 5/2008 | Toneguzzo | G06Q 40/02 705/37 |
| 2008/0243703 | A1* | 10/2008 | Al-Herz | H04L 9/3257 705/69 |
| 2009/0089168 | A1* | 4/2009 | Schneck | G06Q 20/065 705/14.36 |
| 2009/0106112 | A1* | 4/2009 | Dalmia | G06Q 40/12 709/204 |
| 2010/0174598 | A1* | 7/2010 | Khan | G06Q 30/02 705/14.32 |
| 2010/0174646 | A1* | 7/2010 | Cole | G06Q 40/04 705/43 |
| 2013/0054341 | A1* | 2/2013 | Antonucci | G06Q 20/3437 705/14.28 |
| 2013/0061049 | A1* | 3/2013 | Irvine | G06F 21/6218 713/165 |
| 2013/0103484 | A1* | 4/2013 | McLaughlin | G06Q 30/0226 705/14.33 |
| 2013/0311266 | A1* | 11/2013 | Vichich | G07F 9/001 705/14.27 |
| 2014/0233740 | A1* | 8/2014 | Niamut | H04L 9/3013 380/279 |
| 2014/0280475 | A1* | 9/2014 | Chiussi | G06F 8/65 709/203 |
| 2014/0310527 | A1* | 10/2014 | Veugen | H04L 9/065 713/171 |
| 2015/0033301 | A1* | 1/2015 | Pianese | H04L 63/10 726/5 |
| 2015/0170112 | A1* | 6/2015 | DeCastro | G06Q 20/381 705/39 |
| 2015/0227890 | A1* | 8/2015 | Bednarek | G06Q 10/0833 705/26.81 |
| 2015/0262137 | A1* | 9/2015 | Armstrong | G06Q 20/065 705/41 |
| 2015/0262139 | A1* | 9/2015 | Shtylman | G06Q 40/04 705/37 |
| 2015/0262173 | A1* | 9/2015 | Durbin | G06Q 20/38215 705/64 |
| 2015/0262176 | A1* | 9/2015 | Langschaedel | G06Q 20/0658 705/44 |
| 2015/0310476 | A1* | 10/2015 | Gadwa | G06Q 30/0226 705/14.27 |
| 2015/0348169 | A1* | 12/2015 | Harris | G06Q 30/0633 705/26.8 |
| 2016/0012424 | A1* | 1/2016 | Simon | G06Q 20/36 705/67 |
| 2016/0012465 | A1* | 1/2016 | Sharp | G06Q 20/386 705/14.17 |
| 2016/0028552 | A1* | 1/2016 | Spanos | H04L 9/3268 713/178 |
| 2016/0292680 | A1* | 10/2016 | Wilson, Jr. | G06Q 20/02 |
| 2016/0330034 | A1* | 11/2016 | Back | H04L 9/3255 |
| 2016/0371668 | A1* | 12/2016 | Priebatsch | G06Q 20/348 |

FOREIGN PATENT DOCUMENTS

| | | | | |
|---|---|---|---|---|
| JP | 2005204134 | A * | 7/2005 | |
| JP | 2020161105 | A * | 10/2020 | ........... G06Q 20/065 |
| WO | WO-2017212327 | A1 * | 12/2017 | |
| WO | WO-2019125947 | A1 * | 6/2019 | ......... G06Q 30/0215 |
| WO | WO-2021067949 | A1 * | 4/2021 | ........... G06Q 20/326 |

OTHER PUBLICATIONS

Michael Nielsen. How the Bitcoin protocol actually works. (Dec. 6, 2013). Retrieved online Jul. 27, 2021. https://michaelnielsen.org/ddi/how-the-bitcoin-protocol-actually-works/ (Year: 2013).*

FATF Report. Virtual Currencies Key Definitions and Potential AML/CFT Risks. (Jun. 2014) https://www.fatf-gafi.org/media/fatf/documents/reports/Virtual-currency-key-definitions-and-potential-aml-cft-risks.pdf (Year: 2014).* qiibee.com. The global standard for loyalty on the blockchain. (Apr. 17, 2015). Retrieved online Dec. 24, 2021. https://www.qiibee.com/ (Year: 2015).*

Appsolutely.com. Appsolutely. (Mar. 23, 2013). Retrieved online Dec. 24, 2021. https://appsolutely.ph/ (Year: 2013).*

Badev, Anton et al., "Bitcoin: Technical Background and Data Analysis," Finance and Economics Discussion Series, Division of Research & Statistics and Monetary affairs, Federal Reserve Board, Washington D.C., pp. 1-38, Oct. 7, 2014.

* cited by examiner

PRODUCT AWARDS ACCOUNTS 218

PRODUCT AWARDS ACCOUNT 220A
USER_A       222A                    224A

| PRODUCT AWARDS PROGRAMS | PRODUCT AWARDS |
|---|---|
| AIRLINE AWARDS | 112,000 |
| HOTEL AWARDS | 37,500 |
| PAYMENT DEVICE AWARDS | 16,000 |

PRODUCT AWARDS ACCOUNT 220B
PAYMENT DEVICE_B    222B              224B

| PRODUCT AWARDS PROGRAMS | PRODUCT AWARDS |
|---|---|
| HOTEL AWARDS | 138,000 |
| DINING AWARDS | 60,500 |
| TRAVEL AWARDS | 2,000 |

FIGURE 2B

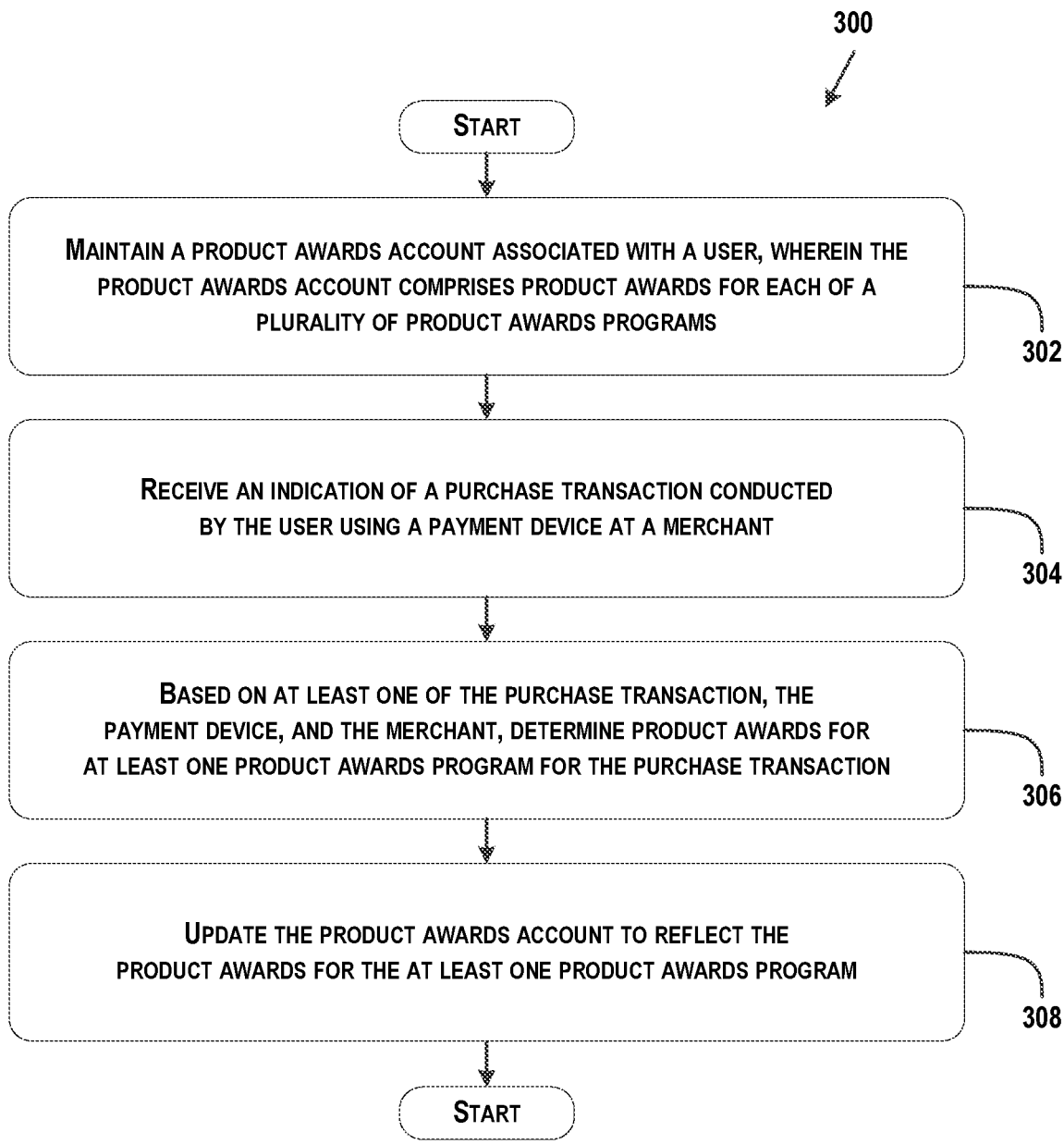

PRODUCT AWARDS
ACCOUNT 500    502                              504

PRODUCT AWARDS PROGRAMS         PRODUCT AWARDS

| | |
|---|---|
| AIRLINE AWARDS | 112,000 |
| HOTEL AWARDS | 36,000 |
| PAYMENT DEVICE AWARDS | 15,280 |

FIGURE 5A

PRODUCT AWARDS
ACCOUNT 500    502                              504

PRODUCT AWARDS PROGRAMS         PRODUCT AWARDS

| | |
|---|---|
| AIRLINE AWARDS | 112,000 |
| HOTEL AWARDS | 37,500 |
| PAYMENT DEVICE AWARDS | 16,000 |

FIGURE 5B

PRODUCT AWARDS ACCOUNT 808

| PRODUCT AWARDS PROGRAMS 810 | PRODUCT AWARDS 812 |
|---|---|
| AIRLINE AWARDS | 80,000 |
| HOTEL AWARDS | 118,000 |
| PAYMENT DEVICE AWARDS | 10,500 |

FIGURE 8C

PRODUCT AWARDS ACCOUNT 808

| PRODUCT AWARDS PROGRAMS 810 | PRODUCT AWARDS 812 |
|---|---|
| AIRLINE AWARDS | 76,000 |
| HOTEL AWARDS | 116,000 |
| PAYMENT DEVICE AWARDS | 9,500 |

FIGURE 8D

PRODUCT AWARDS
ACCOUNT 1108    1110    1112

| PRODUCT AWARDS PROGRAMS | PRODUCT AWARDS |
|---|---|
| AIRLINE AWARDS | 25,000 |
| HOTEL AWARDS | 6,000 |
| PAYMENT DEVICE AWARDS | 100,000 |

FIGURE 11C

PRODUCT AWARDS
ACCOUNT 1108    1110    1112

| PRODUCT AWARDS PROGRAMS | PRODUCT AWARDS |
|---|---|
| AIRLINE AWARDS | 15,000 |
| HOTEL AWARDS | 6,000 |
| PAYMENT DEVICE AWARDS | 100,000 |

FIGURE 11D

PRODUCT AWARDS
ACCOUNT 1700    1702                    1704

| PRODUCT AWARDS PROGRAMS | REWARDS |
|---|---|
| AIRLINE AWARDS | 112,000 |
| HOTEL AWARDS | 36,000 |
| PAYMENT DEVICE AWARDS | 15,280 |

FIGURE 17A

PRODUCT AWARDS
ACCOUNT 1700    1702    1704

| PRODUCT AWARDS PROGRAMS | REWARDS | UNITS |
|---|---|---|
| AIRLINE AWARDS | 112,000 | |
| HOTEL AWARDS | 37,500 | 38.50 |
| PAYMENT DEVICE AWARDS | 16,000 | 88.02 |

METHODS AND SYSTEMS FOR REGULATING OPERATION OF UNITS USING ENCRYPTION TECHNIQUES ASSOCIATED WITH A BLOCKCHAIN

CLAIM FOR PRIORITY

This application claims priority to U.S. patent application Ser. No. 15/178,279, filed Jun. 9, 2016, now allowed, which claims priority to U.S. Provisional Patent Application Ser. No. 62/173,296 filed Jun. 9, 2015, the contents of which are hereby incorporated by reference in their entirety.

BACKGROUND

Some merchants and financial service providers may provide product awards programs through which users may earn product awards. For example, an airline may provide a frequent flier product awards program through which users may earn "miles."

Product awards programs are typically supported through a product awards system. The product awards system may support product awards programs provided by a number of merchants and financial service providers. Typically, the architecture of a product awards system requires each merchant and financial service provider to access the product awards system through a unique interface. These interfaces may implement technology specific to the merchant and/or financial service provider. Such technology specific interfaces may hinder integration within the product awards system.

SUMMARY

The disclosed embodiments may include systems and methods for regulating generation of units according to at least one encryption technique associated with a blockchain.

In one embodiment, a system includes a communication device configured to communicate with a computing device executing an application; a memory storing instructions; and a processor configured to execute the instructions to perform operations. The operations may include maintaining an account associated with the computing device, wherein the account comprises product awards for each of a plurality of product awards programs; receiving, from the computing device through the application, transaction information describing a transaction; based on the transaction information, determining product awards for at least one product awards program for the transaction; using the blockchain, determining a real-time conversion rate for the transaction; based on the real-time conversion rate, converting the product awards to units; updating the account to reflect the units for the at least one product awards program; and entering into the blockchain encrypted data associated with the transaction, wherein the encrypted data is encrypted according to the at least one encryption technique.

In another embodiment, a method includes maintaining an account associated with a computing device, wherein the account comprises product awards for each of a plurality of product awards programs; receiving, from the computing device through the application, transaction information describing a transaction; based on the transaction information, determining product awards for at least one product awards program for the transaction; using the blockchain, determining a real-time conversion rate for the transaction; based on the real-time conversion rate, converting the product awards to units; updating the account to reflect the units for the at least one product awards program; and entering into the blockchain encrypted data associated with the transaction, wherein the encrypted data is encrypted according to the at least one encryption technique. Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIGS. 2A-B are block diagrams of an exemplary product awards management system and exemplary product awards accounts at the product awards management system, consistent with disclosed embodiments.

FIG. 3 is a flowchart of an exemplary product awards earning process, consistent with disclosed embodiments.

FIGS. 5A-5B illustrate a product awards account in an exemplary product awards earning process, consistent with disclosed embodiments.

FIGS. 8A-8D illustrate a product awards application and a product awards account in an exemplary product awards redemption process, consistent with disclosed embodiments.

FIGS. 11A-11D illustrate a product awards application and a product awards account in an exemplary product awards gifting process, consistent with disclosed embodiments.

FIGS. 17A-17B illustrate an account in an exemplary conversion process, consistent with disclosed embodiments.

DETAILED DESCRIPTION

Reference will now be made in detail to the disclosed embodiments, examples of which are illustrated in the accompanying drawings.

Figure 1:
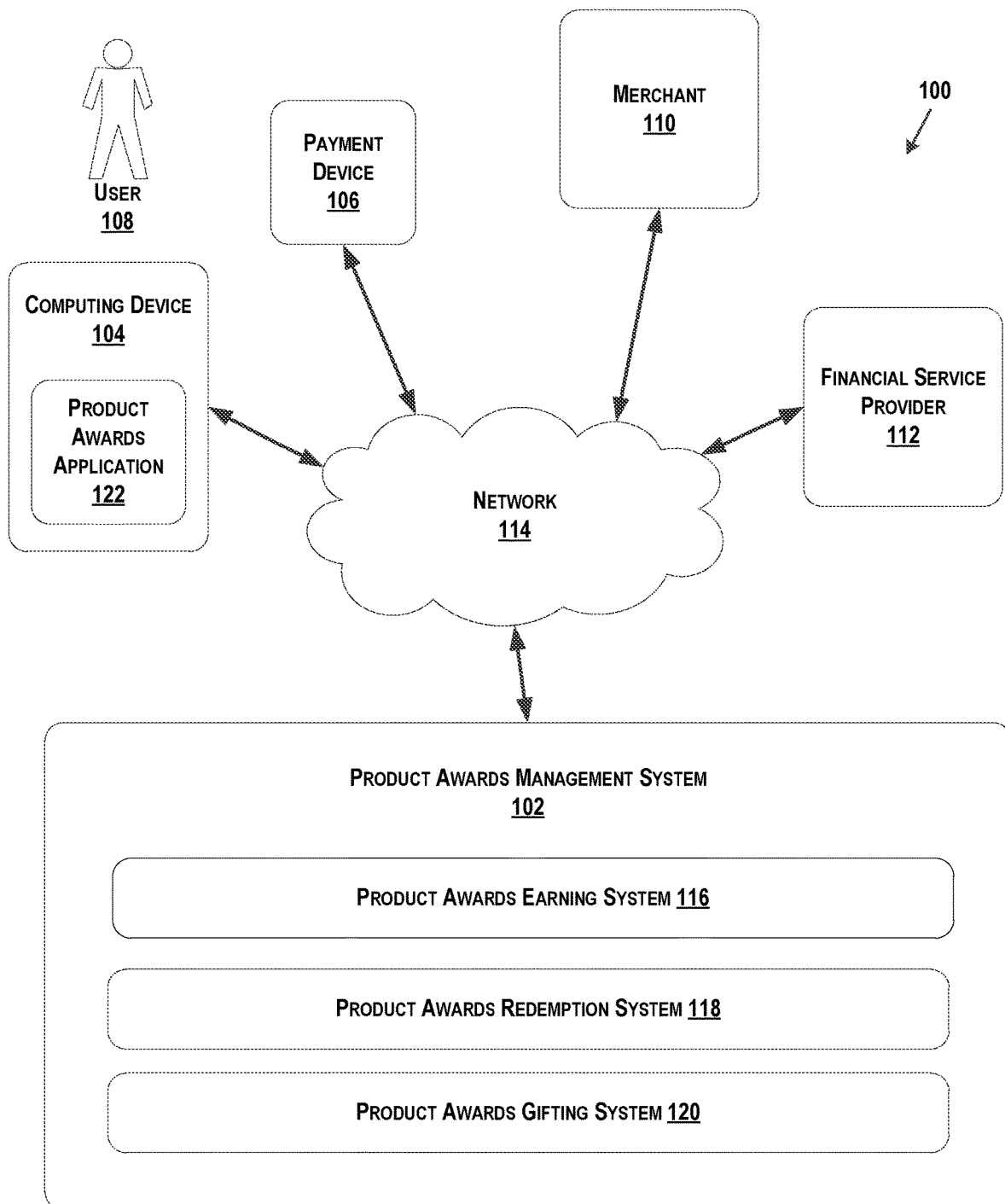
FIG. 1 is a block diagram of an exemplary product awards system, consistent with disclosed embodiments.

FIG. 1 is a block diagram of an exemplary product awards system 100, consistent with disclosed embodiments. System 100 may be configured for performing one or more product awards processes consistent with disclosed embodiments.

As shown, system 100 may include a product awards management system 102, a computing device 104 and a payment device 106 associated with a user 108, a merchant 110, and a financial service provider 112, all of which may be communicatively coupled by a network 114. While only one product awards management system 102, computing device 104, payment device 106, merchant 110, and financial service provider 112 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments.

Product awards management system 102 may be one or more computing devices configured to perform operations consistent with maintaining a plurality of product awards accounts through, for example, a product awards earning system 116. A product awards account may be any account associated with any entity providing a product awards program through which product awards may be earned (e.g., collected, accumulated, etc.) based on transactions, such as purchases. Product awards may include any award, reward, premium, coupon, and/or other item of value awarded in connection with a transaction for a product, such as a purchase transaction to purchase the product. A product may include any good, service, and/or information or other item of value. Other product awards are possible as well. For example, product awards earning system 116 may be configured to maintain a product awards account associated with user 108, computing device 104, and/or payment device 106. Each product awards account may include, for example, product awards for each of a plurality of product awards programs. For example, a product awards account associated with user 108, computing device 104, and/or payment device 106 may include product awards for a product awards program provided by merchant 110, financial service provider 112, and/or another entity. Product awards accounts and/or product awards programs may take other forms as well. Product awards earning system 116 may be further configured to update a product awards account associated with user 108, computing device 104, and/or payment device 106 as product awards are earned through transactions, such as purchases. For example, when user 108 conducts a transaction at merchant 110, product awards earning system 116 may update a product awards account associated with user 108, computing device 104, and/or payment device 106 to reflect earned product awards. Product awards accounts and product awards are further described below in connection with FIGS. 3, 4, and 5A-5B.

Alternatively or additionally, product awards management system 102 may be one or more computing devices configured to perform operations consistent with redemption of product awards through, for example, a product awards redemption system 118. Redemption may be any transaction in which product awards are exchanged for another item of value, such as a good, a service, information, cash, coupons, and/or other product awards. For example, through product awards redemption system 118, user 108 may redeem product awards in a product awards account associated with user 108, computing device 104, and/or payment device 106 to obtain an item of value. Redemption may take other forms as well. Redemption is further described below in connection with FIGS. 6, 7, and 8A-8D.

Still alternatively or additionally, product awards management system 102 may be one or more computing devices configured to perform operations consistent with gifting of product awards through, for example, a product awards gifting system 120. Gifting may be any transaction in which product awards and/or an item of value for which product awards are exchanged through product awards redemption system 118 are transferred to another product awards account. For example, through product awards gifting system 120, user 108 may gift product awards in a product awards account associated with user 108, computing device 104, and/or payment device 106 to another user, computing device, and/or payment device. Gifting may take other forms as well. Gifting is further described below in connection with FIGS. 9, 10, and 11A-11D.

While each of product awards earning system 116, product awards redemption system 118, and product awards gifting system 120 are shown to be included in product awards management system 102, in some embodiments one or more functions performed by product awards earning system 116, product awards redemption system 118, and/or product awards gifting system 120 may be performed by another entity, such as an entity with which product awards management system 102 has contracted. Alternatively or additionally, while product awards management system 102 is shown as a single entity, in some embodiments product awards management system 102 may be or may include multiple entities, and the functions of product awards earning system 116, product awards redemption system 118, and/or product awards gifting system 120 may be distributed among the entities. Product awards management system 102 may take other forms as well.

Still alternatively or additionally, product awards management system 102 may be configured to perform operations consistent with providing a product awards application 122 at computing device 104. Product awards application 122 may be an application that, when executed at computing device 104, enables user 108 to interact with product awards earning system 116 to create, maintain, and/or view a product awards account and/or earn product awards in a product awards account. Alternatively, or additionally, product awards application 122 may be an application that, when executed at computing device 104, enables user 108 to interact with product awards redemption system 118 to redeem product awards in a product awards account for an item of value. Still alternatively or additionally, product awards application 122 may be an application that, when executed at computing device 104, enables user 108 to interact with product awards gifting system 118 to give product awards in a product awards account to a product awards account associated with another user, computing device, and/or payment device.

Computing device 104 may be one or more computing devices configured to perform operations consistent with executing product awards application 122. In some embodiments, computing device 104 may take the form of a desktop or mobile computing device, such as a desktop computer, laptop computer, smartphone, tablet, or any combination of these components. Alternatively, computing device 104 may be configured as a wearable item, including jewelry, smart glasses, or any other device suitable for carrying or wearing on a user's person. Other implementations consistent with disclosed embodiments are possible as well.

Payment device 106 may be a financial services product associated with a financial services account of user 108. The financial services account may be provided by, for example, financial service provider 112 or another financial service provider. Payment device 106 may be any device used to conduct transactions at a merchant, such as merchant 110. Payment device 106 may take the form of, for example, a financial card, such as a credit card, debit card, or loyalty card. Alternatively or additionally, payment device 106 may take the form of another physical financial services product, such as a key fob or smartcard. Still alternatively or additionally, payment device 106 may take the form of a digital financial services product, such as a digital wallet and/or payment application. In some embodiments, payment device 106 may include or may be included in computing device 104. For example, payment device 106 may take the form of a payment application executable by computing device 104. Payment device 106 may take other forms as well.

Merchant 110 may be any entity that offers items of value, such as a retailer, service provider, or any other type of entity that offers items of value for purchase. Merchant 110 may be, may operate, and/or may be associated with one or more retail environments, including physical retail environments (e.g., a store operated by merchant 110) and/or online retail environments (e.g., a webpage provided by merchant 110).

Merchant 110 may be and/or may include one or more computing devices configured to perform operations consistent with participating in transactions, such as purchases. For example, merchant 110 may be configured to participate in a transaction by user 108 in which user 108, using computing device 104 and/or payment device 106, purchases an item of value from merchant 110.

Financial service provider 112 may be any entity that provides, maintains, manages, or otherwise offers financial services. For example, financial service provider 112 may be a bank, credit card issuer, or any other type of financial service entity that generates, provides, manages, and/or maintains financial services accounts. For example, financial service provider 112 may generate, provide, manage, and/or maintain a financial services account associated with user 108. In some embodiments, computing device 104 and/or payment device 106 may be associated with the financial services account as well.

Merchant 110 and/or financial service provider 112 may be associated with one or more product awards programs. A product awards program may be any program through which product awards may be accumulated based on transactions, such as purchases. For example, merchant 110 may be associated with a product awards program through which user 108 may accumulate product awards based on transactions made by user 108 at merchant 110. For instance, if merchant 110 is an airline, merchant 110 may be associated with a frequent flyer program. As another example, financial service provider 112 may be associated with a product awards program associated with payment device 106 through which user 108 may accumulate product awards based on transactions made by user 108 using payment device 106. For instance, if financial service provider 112 is a bank, financial service provider 112 may be associated with a banking product awards program.

Product awards programs associated with merchant 110 and/or financial service provider 112 may be provided, managed, and/or maintained in whole or in part by product awards management system 102. For example, product awards earning system 116 at product awards management system 102 may maintain a product awards account for user 108 that includes product awards for a product awards program associated with merchant 110 and/or a product awards program associated with financial service provider 112. Other product awards programs are possible as well.

Network 114 may be any type of network configured to provide communication between components of system 100. For example, network 114 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2A:
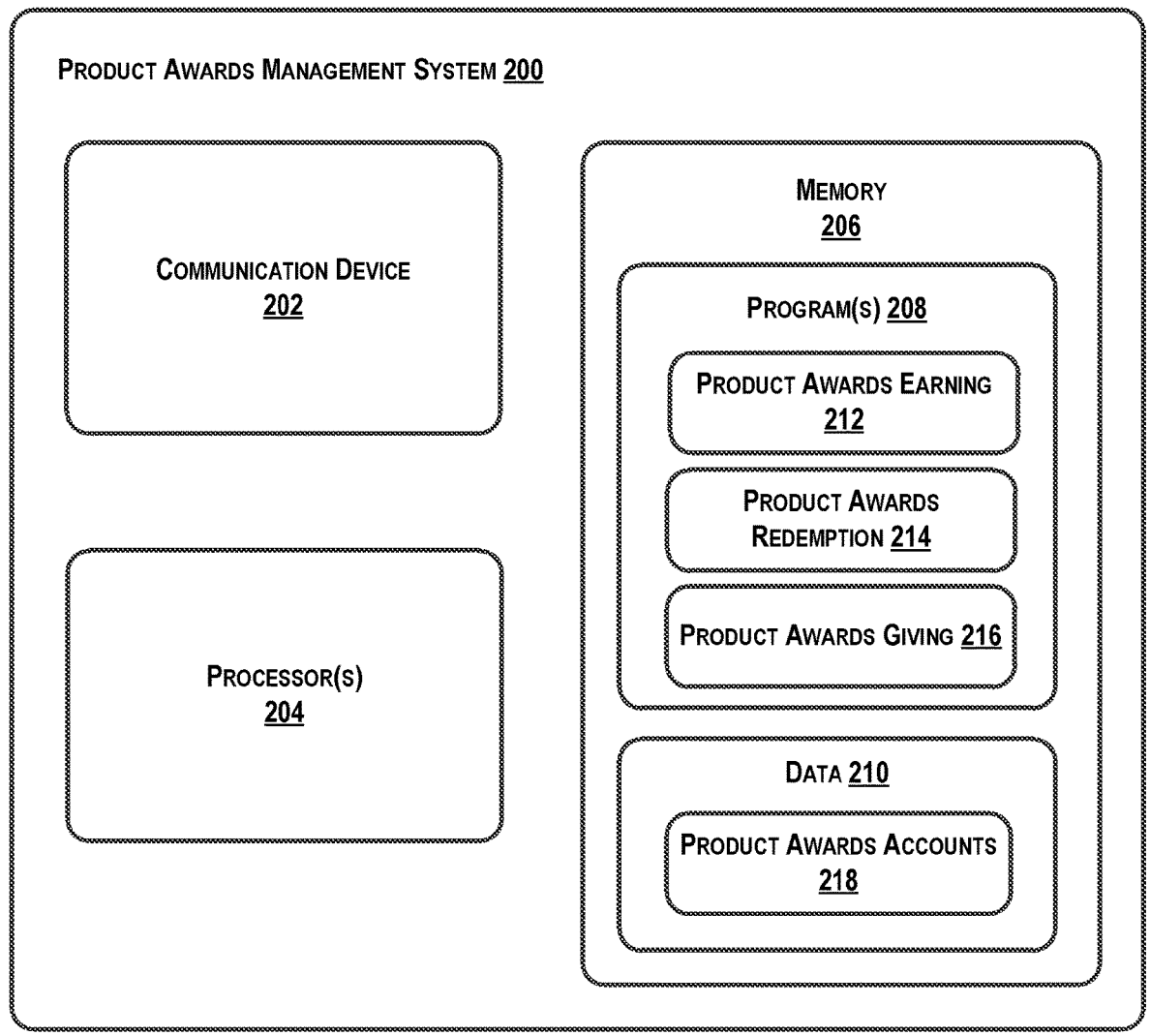

FIG. 2A is a block diagram of an exemplary product awards management system 200, consistent with disclosed embodiments. As shown, product awards management system 200 may include a communication device 202, one or more processor(s) 204, and memory 206 including one or more program(s) 208 and data 210. Product awards management system 200 may take the form of a server, general purpose computer, mainframe computer, or any combination of these components.

Communication device 202 may be configured to communicate with one or more computing devices, such as computing device 104. In some embodiments, communication device 206 may be configured to communicate with the computing device(s) through an application executing on the computing device(s), such as product awards application 122. Product awards management system 200 may, for example, be configured to enable a user, such as user 108, to create, maintain, and/or view a product awards account and/or earn, redeem, or gift product awards in a product awards account maintained at product awards management system 200 through the product awards application.

Alternatively or additionally, communication device 202 may be configured to communicate with one or more merchants and/or financial service providers, such as merchant 110 and financial service provider 112. Product awards management system 200 may, for example, be configured to communicate with the merchant(s) and/or financial service provider(s) to provide, manage, and/or maintain one or more product awards programs associated with the merchant(s) and/or financial service provider(s). For example, product awards management system 200 may maintain product awards accounts that include product awards for one or more product awards program(s) associated with the merchant(s) and/or financial service provider(s).

Processor(s) 204 may include one or more known processing devices, such as a microprocessor from the Pentium™ or Xeon™ family manufactured by Intel™, the Turion™ family manufactured by AMD™, or any of various processors manufactured by other processor manufacturers, for example. The disclosed embodiments are not limited to any type of processor(s) otherwise configured to meet the computing demands required of different components of product awards management system 200.

Memory 206 may include one or more storage devices configured to store instructions used by processor(s) 204 to perform functions related to disclosed embodiments. For example, memory 206 may be configured with one or more software instructions, such as program(s) 208 that may perform one or more operations when executed by processor(s) 204. The disclosed embodiments are not limited to separate programs or computers configured to perform dedicated tasks. For example, memory 206 may include a single program 208 that performs the functions of product awards management system 200, or program(s) 208 may comprise multiple programs. Memory 206 may also store data 210 that is used by program(s) 208. Data 210 may include, for example, product awards accounts 218 for one or more user(s), computing device(s), and/or payment device(s).

In certain embodiments, memory 206 may store sets of instructions for carrying out the processes described below in connection with FIGS. 3, 6, and 9. For example, memory 206 may store instructions to carry out processes relating to product awards earning 212, instructions to carry out processes relating to product awards redemption 214, and/or instructions to carry out processes relating to product awards gifting 216. Other instructions are possible as well. In general, instructions may be executed by processor(s) 204 to perform one or more processes consistent with disclosed embodiments.

The components of product awards management system 200 may be implemented in hardware, software, or a combination of both hardware and software, as will be apparent to those skilled in the art. For example, although one or more components of product awards management system 200 may be implemented as computer processing instructions, all or a portion of the functionality of product awards management system 200 may be implemented instead in dedicated electronics hardware.

In some embodiments, product awards management system 200 may also be communicatively connected to one or more database(s) (not shown). Alternatively, such database(s) may be located remotely from product awards management system 200. Product awards management system 200 may be communicatively connected to such database(s) through a network, such as network 114 described above. Such database(s) may include one or more memory devices that store information and are accessed and/or managed through product awards management system 200. In some embodiments, product awards accounts 218 may be implemented with a database(s). By way of example, such database(s) may include Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data from the database(s).

FIG. 2B is a block diagram illustrating example product awards accounts 218 maintained by product awards management system 200. As shown, product awards accounts 218 may include product awards accounts associated with a number of users, computing devices, and/or payment devices. For example, as shown, product awards accounts 218 may include a product awards account 220A associated with a user, User_A. As another example, product awards accounts 218 may include a product awards account 220B associated with a payment device, Payment Device_B. Product awards accounts 218 may include more and/or different product awards accounts as well.

Each product awards account may include product awards for a plurality of product awards programs. For example, as shown, product awards account 220A may include product awards for product awards programs 222A including an "Airline Awards" product awards program, a "Hotel Awards" product awards program, and a "Payment Device Awards" product awards program. As another example, product awards account 220B may include product awards for product awards programs 222B including a "Hotel Awards" product awards program, a "Dining Awards" product awards program, and a "Travel Awards" product awards program. It will be understood that the product awards programs 22A and 222B are merely exemplary and are not meant to be limiting; other product awards programs are possible as well.

For each product awards program in a product awards account, product awards accounts 218 may specify a value of product awards. For example, as shown, product awards account 220A may specify a value of 112,000 product awards for the "Airline Awards" product awards program. As another example, as shown, product awards account 220B may specify a value of 60,500 product awards for the "Dining Awards" program. In some embodiments, the values of the product awards may be arbitrary, not corresponding to any currency. In some embodiments the values of the product awards may be specified in a denomination, such as "points" or "miles." The values of the product awards may be determined according to the product awards programs and/or according to terms set by a merchant, financial service provider, and/or other entity associated with the product awards program.

As noted above, product awards in product awards accounts may be earned, redeemed, and/or gifted through the product awards management system. FIG. 3 is a flowchart of an exemplary product awards earning process 300, consistent with disclosed embodiments. In some embodiments, product awards earning process 300 may be carried out by a product awards management system, such as product awards management systems 102 and 200 described above.

As shown, product awards earning process 300 includes, at block 302, maintaining a product awards account associated with a user. The product awards account may be directly associated with the user and/or may be associated with a payment device and/or computing device associated with the user. As described above in connection with FIG. 2B, the product awards account may include product awards for each of a plurality of product awards programs.

Product awards earning process 300 further includes, at block 304, receiving an indication of a transaction conducted by the user using a payment device at a merchant. The product awards management system may receive the indication from, for example, the user, the payment device, the merchant, a computing device associated with the user, and/or a financial service provider. For example, the user may provide the indication to the product awards management system through, for example, a product awards application executed on a computing device, such as product awards application 122 described above. The user may, for instance, take a photograph of a receipt, display, or other evidence of the transaction and upload the photograph to the product awards management system using the product awards application. As another example, for a transaction authorized by the financial service provider, the merchant and/or the financial service provider may provide the indication to the product awards management system when the transaction is authorized.

At block 306, product awards earning process 306 includes, based on at least one of the transaction, the payment device, and the merchant, determining product awards for at least one product awards program for the transaction. For example, the product awards may vary with an amount of the transaction and/or a time at which the transaction occurred. As another example, the at least one product awards program may include a "Payment Device" product awards program in which product awards may be earned on transactions made using the payment device according to the terms of the "Payment Device" product awards program. As still another example, the at least one product awards program may include a "Dining Awards" product awards program in which product awards may be earned on transactions made at the merchant (e.g., a restaurant) according to the terms of the "Dining Awards" product awards program.

In some embodiments, terms of a product awards program may specify that the product awards may be determined according to a predefined algorithm taking as an input one or more of the amount of the transaction, a time at which the transaction occurred, a payment device used in the transaction, and/or the merchant at which the transaction was made. In some embodiments, the predefined algorithm may vary among product awards programs. For example, an "Airline Awards" product awards program may specify one predefined algorithm to determine product awards for the "Airline Awards" product awards program, while a "Hotel Awards" product awards program may specify another predefined algorithm to determine product awards for the "Hotel Awards" product awards program. In some embodiments, product awards may be determined for more than one product awards program for the transaction. For example, product awards may be determined for a "Payment Device Awards" product awards program as well as for an "Airline Awards" product awards program.

Product awards earning process 306 further includes, at block 308, updating the product awards account to reflect the product awards for the at least one product awards program. For example, where the product awards determined in block 308 included product awards for an "Airline Awards" product awards program and for a "Hotel Awards" product awards program, updating the product awards account may involve adding the product awards for the "Airline Awards" product awards program determined in block 308 to previously determined product awards for the "Airline Awards" product awards program and adding the product awards for the "Hotel Awards" product awards program determined in block 308 to previously determined product awards for the "Hotel Awards" product awards program. An example product awards earning process is further described in connection with FIGS. 4 and 5A-5B.

Figure 4:
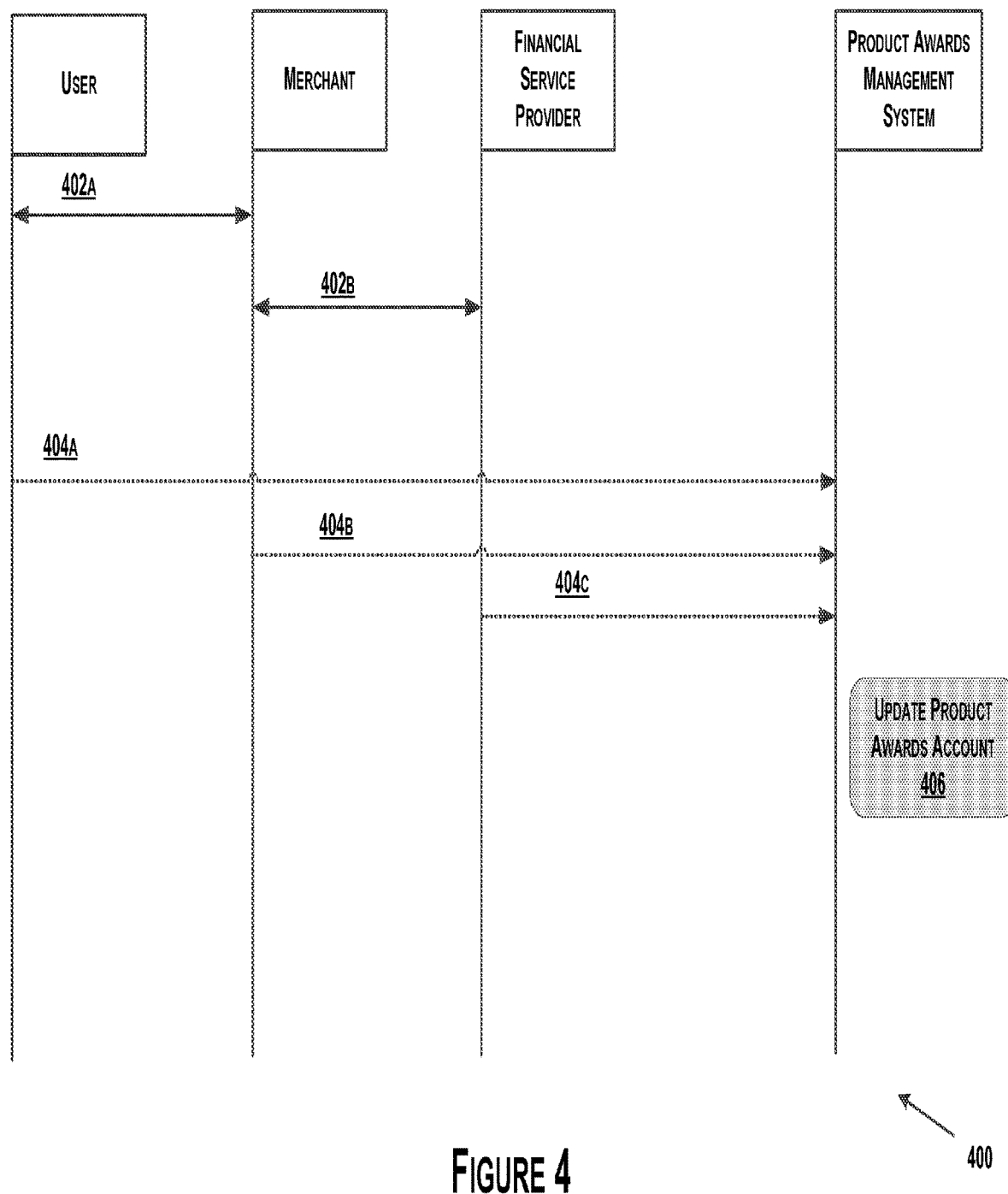
FIG. 4 illustrates message flow in an exemplary product awards earning process, consistent with disclosed embodiments.

FIG. 4 illustrates another message flow 400 in an exemplary product awards earning process, consistent with disclosed embodiments. FIGS. 5A-5B illustrate a product awards account 500 in an exemplary product awards earning process, consistent with disclosed embodiments. As shown in FIG. 4, the message flow 400 begins with message(s) 402A through which a user conducts a transaction with a merchant. For example, a user may use a computing device and/or a payment device to make payment for an item of value offered by the merchant.

With message(s) 402B, the merchant may seek authorization of the transaction from a financial service provider maintaining a financial services account associated with the user, and the financial service provider may authorize the transaction. Once the transaction has been authorized, the product awards management system may receive an indication of the transaction. The indication may indicate, for example, the user, the payment device and/or computing device used to conduct the transaction, the merchant, the financial service provider, the payment, and/or the item of value.

In some embodiments, the product awards management system may receive the indication from the user, as shown with message(s) 404A. For example, the indication may take the form of a photograph or other data captured by the user using, for example, the computing device, and the indication may be provided to the product awards management system through, for example, a product awards application executed at the computing device. Alternatively or additionally, in some embodiments the product awards management system may receive the indication from the merchant, as shown with message(s) 404B. For example, the merchant may provide the indication to the product awards management system after the transaction is authorized. Still alternatively or additionally, in some embodiments the product awards management system may receive the indication from the financial service provider, as shown with message(s) 404C. For example, the financial service provider may provide the indication to the product awards management system after the transaction is authorized. The product awards management system may receive the indication in other manners as well.

The product awards management system 406 may update the product awards account for the user at 406. As shown in FIGS. 5A-5B, updating the product awards account 500 may involve, for example, updating the product awards 504 for at least one product awards program 502 in the product awards account. As shown, the product awards programs 502 may include, for example, an "Airline Awards" product awards program, a "Hotel Awards" product awards program, and a "Payment Device" product awards program.

Prior to the update, for instance, as shown in FIG. 5A, the product awards account 500 may show product awards having a value of 112,000 for an "Airline Awards" product awards program, product awards having a value of 36,000 for a "Hotel Awards" product awards program, and product awards having a value of 15,280 for a "Payment Device Awards" product awards program.

By the transaction, the user may earn product awards for the "Hotel Awards" product awards program and the "Payment Device" product awards program. Accordingly, following the update, as shown in FIG. 5B, the product awards for the "Airline Awards" product awards program may be unchanged, as the underlying transaction does not qualify for product awards under the "Airline Awards" product awards program. The product awards for the "Hotel Awards" product awards program and for the "Payment Device Awards" product awards program, by contrast, may be updated. For instance, as shown, the product awards for the "Hotel Awards" product awards may be increased from the value of 36,000 to a value of 37,500, while the product awards for the "Payment Device Awards" may be increased from the value of 15,280 to a value of 16,000. Other updates are possible as well. In some embodiments, the product awards management system may notify the user, computing device, merchant, and/or financial service provider of the update to the product awards account.

Figure 6:
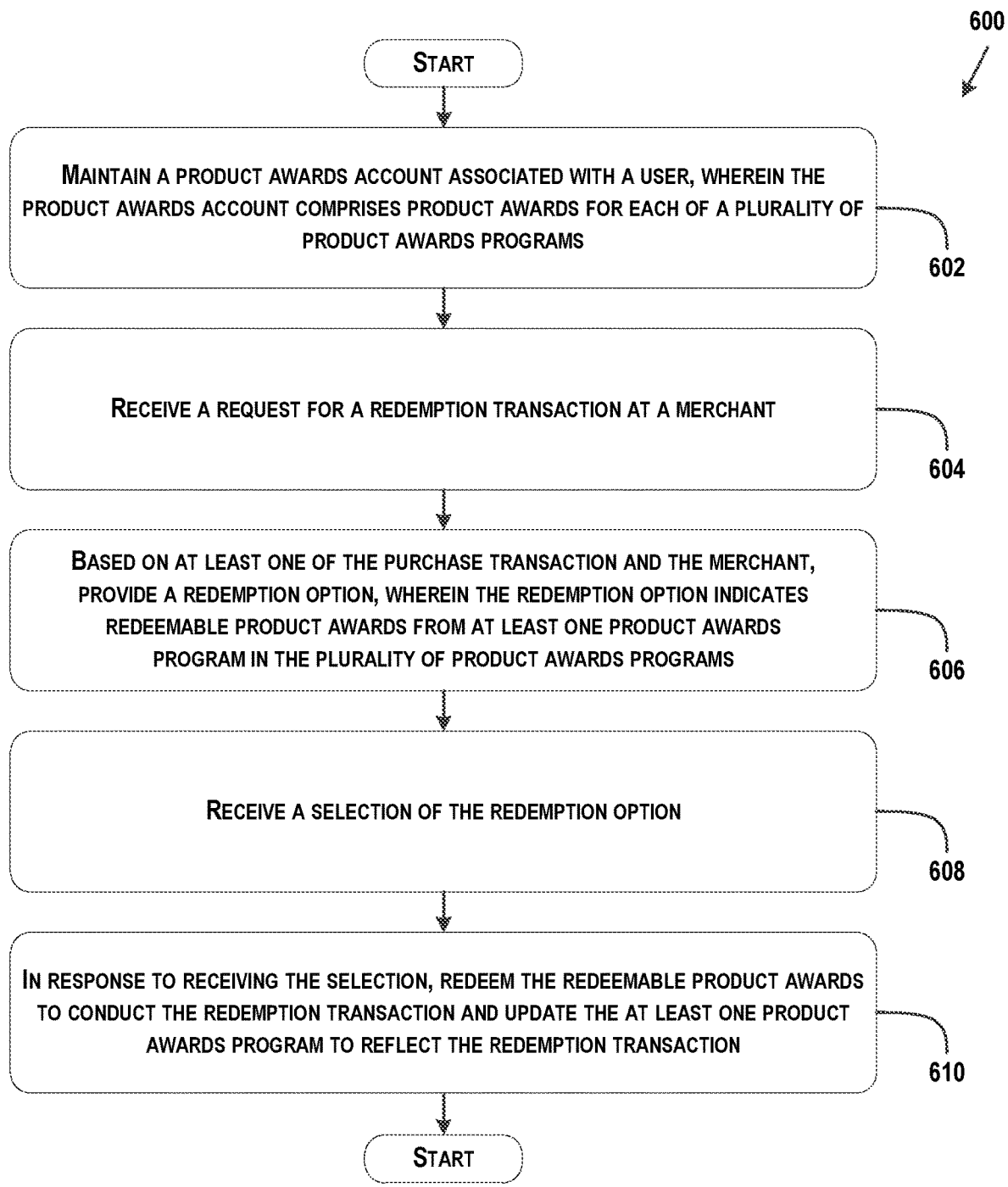
FIG. 6 is a flowchart of an exemplary product awards redemption process, consistent with disclosed embodiments.

FIG. 6 is a flowchart of an exemplary product awards redemption process 600, consistent with disclosed embodiments. In some embodiments, product awards redemption process 600 may be carried out by a product awards management system, such as product awards management systems 102 and 200 described above.

As shown, product awards redemption process 600 includes, at block 602, maintaining a product awards account associated with a user. The product awards account may include product awards for each of a plurality of product awards programs, as described above.

Product awards redemption process 600 continues at block 604 with receiving a request for a redemption transaction at a merchant. The redemption transaction may be any transaction in which product awards, alone or in combination with currency, are redeemed for an item of value. For example, a redemption transaction may involve a user redeeming product awards, alone or in combination with currency, to purchase an item of value from a merchant.

The request for the redemption transaction may be received from, for example, the user. For example, the user may request, through a product awards application on a computing device, to redeem product awards for an item of value from a merchant. Alternatively or additionally, the request for the redemption transaction may be received from, for example, a merchant. For example, the merchant may offer to the user to redeem product awards for an item of value from the merchant, and the user may accept the offer. In response to the user's acceptance, the merchant may provide the request for the redemption transaction to the product awards management system.

At block 606, the product awards redemption process 600 includes, based on at least one of the transaction and the merchant, providing a redemption option. The redemption option may indicate redeemable product awards from at least one product awards program in the plurality of product awards programs. Redeemable product awards may be deducted from a product awards program in exchange for an item of value from the merchant.

For example, the redemption option may indicate that the user may redeem a value of product awards from a "Dining Awards" product awards program to purchase the item of value from the merchant. As another example, the redemption option may indicate that the user may redeem a value of product awards from a "Dining Awards" product awards program in combination with a value of product awards from an "Airline Awards" product awards program to purchase the item of value from the merchant. As still another example, the redemption option may indicate that the user may redeem a value of product awards from a "Payment Device" product awards program in combination with a value of currency to purchase the item of value from the merchant. In some embodiments, the redemption option may include more than one option. For example, the redemption option may include each of the examples described above.

The redemption option may be provided to the user (e.g., through the product awards application on the computing device) and/or may be provided to the merchant. Where the redemption option is provided to the merchant, the merchant may present the redemption option to the user. For example, in a physical retail environment, the merchant may present the redemption option to the user through a point-of-sale terminal. As another example, in an online retail environment, the merchant may present the redemption option the user through a pop-up notification in a web browser application.

The product awards redemption process 600 includes, at block 608, receiving a selection of the redemption option. The selection may be received from, for example, the user (e.g., through the product awards application on the computing device). Alternatively or additionally, the merchant may receive the selection from the user, and the merchant provide the selection to the product awards management system. For example, in a physical retail environment, the merchant may receive the selection through a point-of-sale terminal. As another example, in an online retail environment, the merchant may receive the selection through a pop-up notification in a web browser application. Other examples are possible as well.

At block 610, the product awards redemption process 600 includes, in response to receiving the selection, redeeming the redeemable product awards to conduct the redemption transaction and updating the at least one product awards program to reflect the redemption transaction. Redeeming the redeemable product awards to conduct the redemption transaction may involve, for example, transferring the redeemable product awards from the at least one product awards program to the merchant and transferring the merchant's item of value to the user. The redeemable product awards may be redeemed in other manners as well. Updating the at least one product awards program to reflect the redemption transaction may involve, for example, deducting the redeemable product awards from the at least one product awards program.

Figure 7:
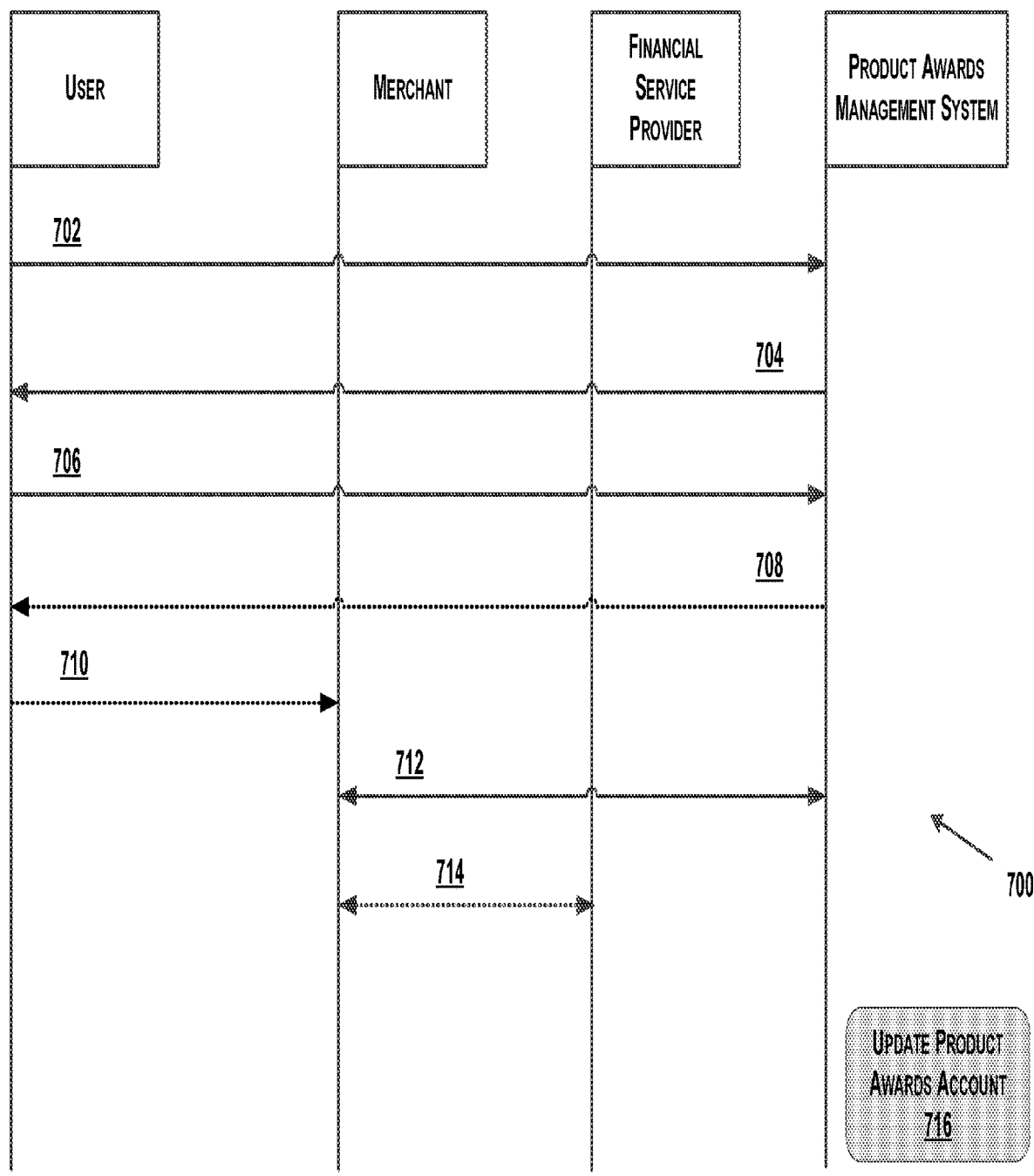
FIG. 7 illustrates message flow in an exemplary product awards redemption process, consistent with disclosed embodiments.
Figure 8A:
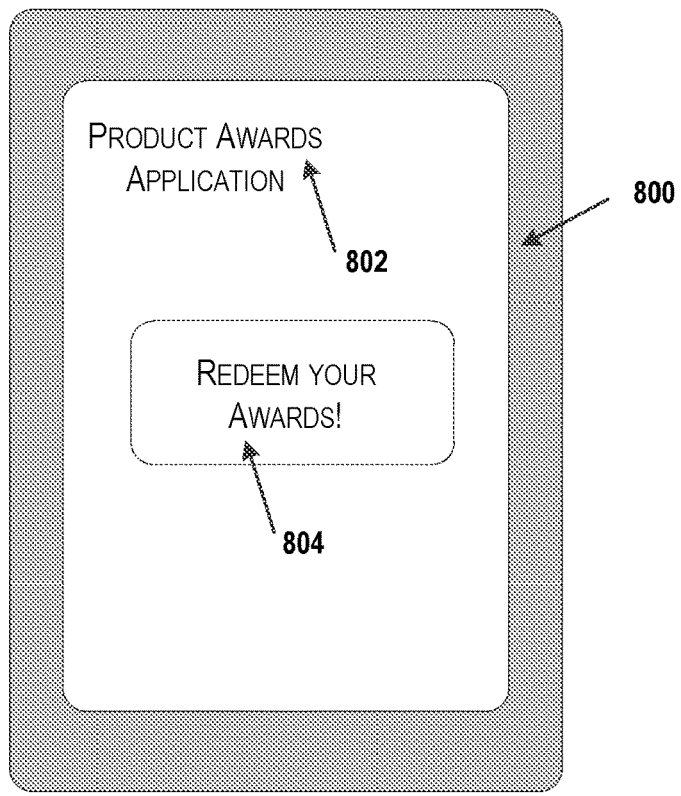

An example product awards redemption process is further described in connection with FIGS. 7 and 8A-8D. FIG. 7 illustrates message flow in an exemplary product awards redemption process, consistent with disclosed embodiments. FIGS. 8A-8D illustrate a product awards application and a product awards account in an exemplary product awards redemption process, consistent with disclosed embodiments. As shown in FIG. 7, the message flow 700 begins with message(s) 702, with which a user requests a redemption transaction from product awards management system. In some embodiments, the user may request the redemption transaction through a product awards application 802 executed on a computing device 800, as shown in FIG. 8A. For example, the user may select a selection 804 to "Redeem Your Awards!" in the product awards application 802. The computing device 800 may provide the request to the product awards management system.

Figure 8B:
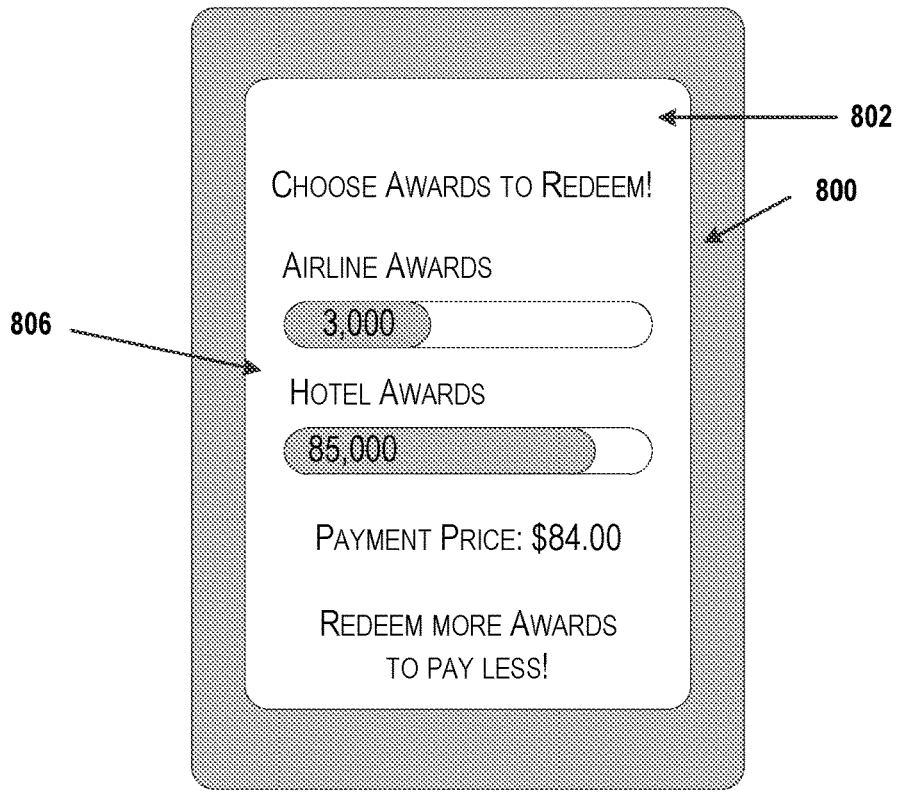

In response to receiving the request, the product awards management system provides a redemption option to the computing device with message(s) 704. An example redemption option 806 is shown in FIG. 8B. The redemption option 806 may specify product awards from one or more product awards programs associated with the user that may be redeemed to purchase the item of value. In some embodiments, the product awards application 802 may permit a user to vary product awards from one or more product awards programs to view various redemption options. For example, a user may increase product awards from one product awards program while decreasing product awards from another. As another example, a user may increase product awards from a product awards program to decrease a payment price. Other examples are possible as well. The user may select the redemption option through the product awards application, as shown by message(s) 706.

In some embodiments, in response to receiving the selection of the redemption option, the product awards management system may provide to the computing device a redemption certificate with message(s) 708. The redemption certificate may take the form of, for example, a bar code, two-dimensional bar code (e.g., QR code), or alphanumeric code for display in the product awards application. Other redemption certificates are possible as well. The computing device may, with message(s) 710, provide the redemption certificate to the merchant to conduct the redemption transaction.

With message(s) 712, the merchant may conduct the redemption transaction with the product awards management system. In embodiments where the redemption option involved a combination of redeemable product awards and currency, the merchant may additionally conduct a transaction with the financial service provider with message(s) 714 for the amount of currency indicated in the redemption option. In these embodiments, the currency may be provided using, for example, a payment device and/or cash.

The product awards management system may update the product awards account for the user at 716. As shown in FIGS. 8C-8D, updating the product awards account 808 may involve, for example, updating the product awards 812 for at least one product awards program 812 in the product awards account. As shown, the product awards programs 812 may include, for example, an "Airline Awards" product awards program, a "Hotel Awards" product awards program, and a "Payment Device" product awards program. Other product awards programs 812 are possible as well.

Prior to the update, for instance, as shown in FIG. 8C, the product awards account 808 may show product awards having a value of 80,000 for an "Airline Awards" product awards program, product awards having a value of 118,000 for a "Hotel Awards" product awards program, and product awards having a value of 10,500 for a "Payment Device Awards" product awards program. Following the update, as shown in FIG. 8D, the product awards for the "Payment Device Awards" product awards program may be unchanged. This may be because, for example, the underlying transaction does not qualify for product awards under the "Payment Device Awards" product awards program. The product awards for the "Airline Awards" product awards program and for the "Hotel Awards" product awards program, by contrast, may be updated. For instance, as shown, the product awards for the "Airline Awards" product awards may be decreased from the value of 80,000 to a value of 76,000, while the product awards for the "Hotel Awards" may be decreased from the value of 10,500 to a value of 9,500 according to the redemption option. Other updates are possible as well. In some embodiments, the product awards management system may notify the user, computing device, merchant, and/or financial service provider of the update to the product awards accounts.

Figure 9:
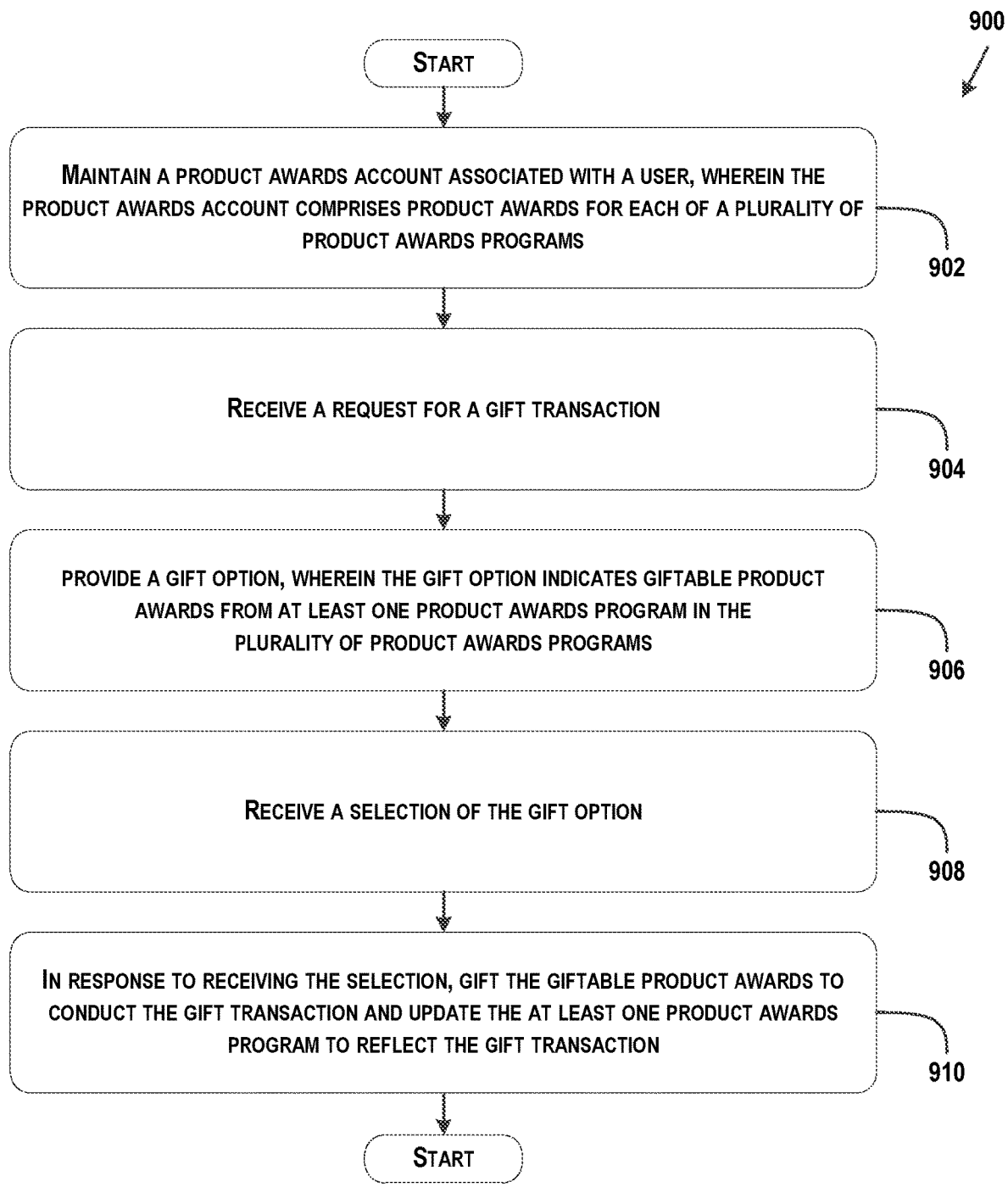
FIG. 9 is a flowchart of an exemplary product awards gifting process, consistent with disclosed embodiments.

FIG. 9 is a flowchart of an exemplary product awards gifting process 900, consistent with disclosed embodiments. In some embodiments, product awards gifting process 900 may be carried out by a product awards management system, such as product awards management systems 102 and 200 described above.

Product awards gifting process 900 includes, at block 902, maintaining a product awards account associated with a user. The product awards account may include product awards for a plurality of product awards programs, as described above.

The product awards gifting process 900 further includes, at block 904, receiving a request for a gift transaction. A gift transaction may be any transaction in which product awards (and/or an item of value for which product awards are exchanged through a redemption transaction) are transferred to another product awards account. The request may be received from, for example, a computing device.

At block 906, the product awards gifting process 900 includes providing a gift option. The gift option may be provided to the user through, for example, a product awards application executed at the computing device. The gift option may indicate giftable product awards from at least one product awards program in the plurality of product awards programs in the user's product awards account. The gift option may include more than one option of giftable product awards. The gift option may further indicate a recipient of the gift. The recipient may be identified by, for example, a product awards account, a telephone number, an email address, and/or a mailing address. The recipient may be identified in other manners as well.

At block 908, the product awards gifting process 900 includes receiving a selection of the gift option. The selection may be received from the user through, for example, the product awards application executed at the computing device. The product awards gifting process 900 may further include, at block 910, in response to receiving the selection, gifting the giftable product awards to conduct the gift transaction and updating the at least one product awards program in the user's product awards account to reflect the gift transaction. Gifting the giftable product awards to conduct the gift transaction may involve, for example, deducting the giftable product awards from the user's product awards account and providing the giftable product awards to the identified recipient. Providing the giftable product awards to the identified recipient may involve, for example, adding the giftable product awards to a product awards account associated with the recipient or texting, emailing, and/or mailing the giftable product awards (e.g., in the form of gift certificate) to the recipient. An example product awards gifting process is further described in connection with FIGS. 10 and 11A-11D.

Figure 10:
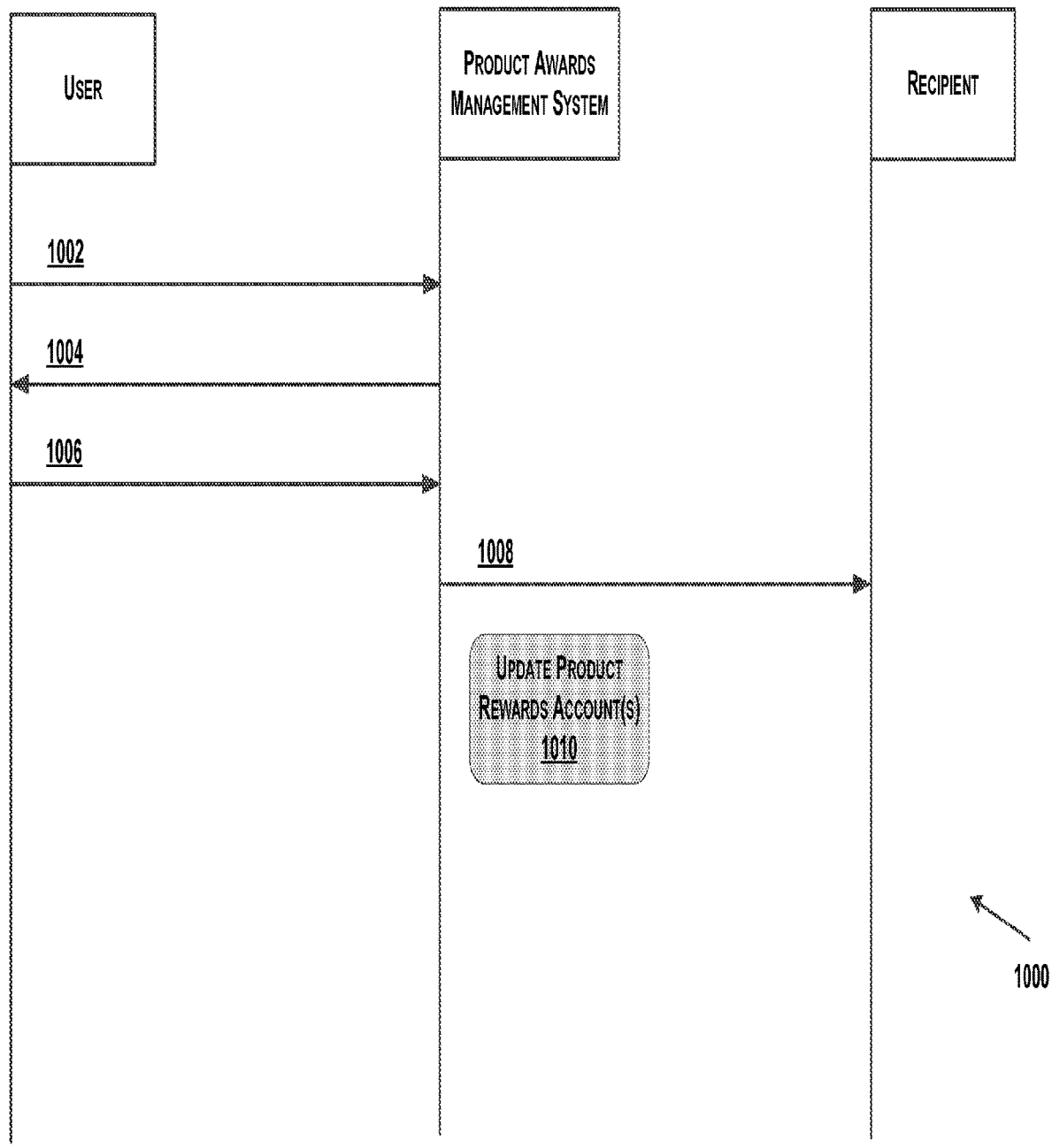
FIG. 10 illustrates message flow in an exemplary product awards gifting process, consistent with disclosed embodiments.
Figure 11A:
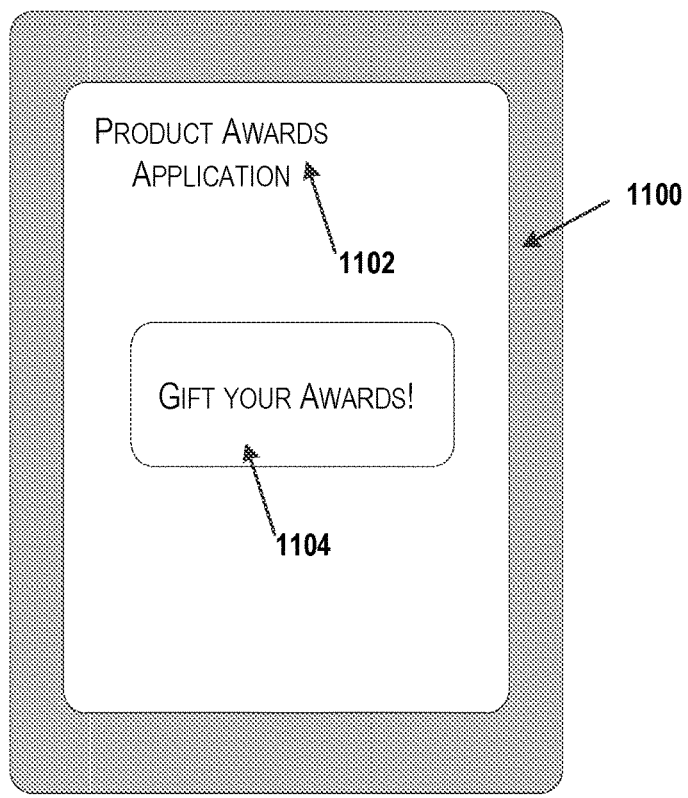

FIG. 10 illustrates message flow in an exemplary product awards gifting process, consistent with disclosed embodiments. FIGS. 11A-11D illustrate a product awards application and a product awards account in an exemplary product awards gifting process, consistent with disclosed embodiments. As shown in FIG. 10, the message flow 1000 begins with message(s) 1002, with which the users provides to the product awards management system a requests for gift transaction. The user may provide the request through, for example, a product awards application 1102 executed at a computing device 1100, as shown in FIG. 11A. For example, the user may select a selection 1104 to "Gift Your Awards!" in the product awards application 1102. The computing device 1100 may provide the request to the product awards management system.

Figure 11B:
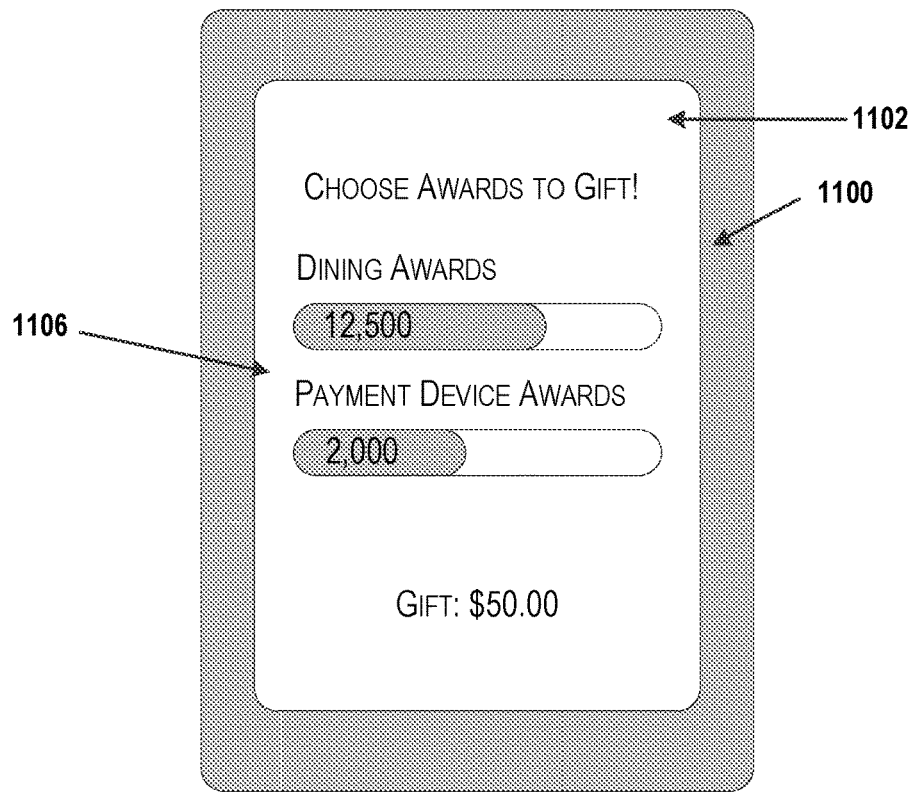

With message(s) 1004, the product awards management system provides a gift option to the user. The gift option may indicate giftable product awards from at least one product awards program associated with the first computing device. An example gift option 1106 is shown in FIG. 11B. The gift option 1106 may specify product awards from one or more product awards accounts associated with the user that may be redeemed to purchase the item of value. In some embodiments, the product awards application 1102 may permit a user to vary product awards from one or more product awards programs to view various gift options. The gift may be a gift of product awards or of currency. For example, a user may increase product awards from one product awards program while decreasing product awards from another. As another example, a user may increase product awards from one or more product awards programs to increase a currency value of the gift. As still another example, a user may gift currency in combination with product awards from one or more product awards programs. Other examples are possible as well. The user may select the gift option through the product awards application, as shown by message(s) 1006.

With message(s) 1008, the product awards management system may conduct the gift transaction, providing the gift to the recipient. The product awards management system may update the product awards account associated with the user at 1010. Updating the product awards account may involve, for example, deducting the giftable product awards from the user's account. In some embodiments, such as those where the gift is in the form of product awards, the product awards management system may additionally update a product awards account associated with the recipient by adding the giftable product awards.

As shown in FIGS. 11C-11D, for example, updating the product awards account 1100 associated with the user may involve, for example, updating the product awards 1112 for at least one product awards program 1110 in the product awards account. As shown, the product awards programs 1110 may include, for example, an "Airline Awards" product awards program, a "Hotel Awards" product awards program, and a "Payment Device" product awards program. Other product awards programs 1110 are possible as well.

Prior to the update, for instance, as shown in FIG. 11C, the product awards account 1108 may show product awards having a value of 25,000 for an "Airline Awards" product awards program, product awards having a value of 6,000 for a "Hotel Awards" product awards program, and product awards having a value of 100,000 for a "Payment Device Awards" product awards program. Following the update, as shown in FIG. 11D, the product awards for the "Hotel Awards" and "Payment Device Awards" product awards program may be unchanged. This may be because, for example, the gift option selected by the user did not include any product awards in these product awards programs. The product awards for the "Airline Awards" product awards program, by contrast, may be updated. For instance, as shown, the product awards for the "Airline Awards" product awards may be decreased from the value of 25,000 to a value of 15,000 according to the gift option.

While not shown, in some embodiments a product awards account associated with the recipient may be updated as well. For example, where the gift is in the form of product awards, the product awards management system may additionally update a product awards account associated with the recipient by adding the giftable product awards. For instance, product awards in an "Airline Awards" product awards program may be increased by a value of 10,000. As another example, the product awards in an "Airline Awards" program may be increased by a different value and/or product awards in another product awards program may be increased by any value. Other updates are possible as well. In some embodiments, the product awards management system may notify the user, first computing device, second computing device, and/or a user associated with the second computing device of the update to the product awards accounts.

The above description focused on product awards accounts in which product awards took arbitrary values, such as "points" or "miles." In some embodiments, however, product awards may take a non-arbitrary value, such as a unit whose operation is regulated according to one or more encryption techniques. The encryption techniques may be, for example, encryption techniques associated with a blockchain. The encryption technique(s) may include, for example, hashing techniques, such as a cryptographic hash. In some embodiments, the units may correspond to a currency and/or a cryptocurrency, such as bitcoin or Ven.

In some embodiments, operation of the units may include, for example, generation of the units, redemption of the units, and/or exchange of the units. In some embodiments, generation, redemption, and/or exchange of the units may be governed by a single encryption technique and/or by multiple encryption techniques, and the encryption technique(s) for each of generation, redemption, and/or exchange may be the same or different.

Operation of the units may be maintained in the blockchain, which may include a number of transactions involving the units. For example, each transaction involving the units may be entered into the blockchain as encrypted data associated with the transaction. The encrypted data may be encrypted according to the encryption technique(s).

Figure 12:
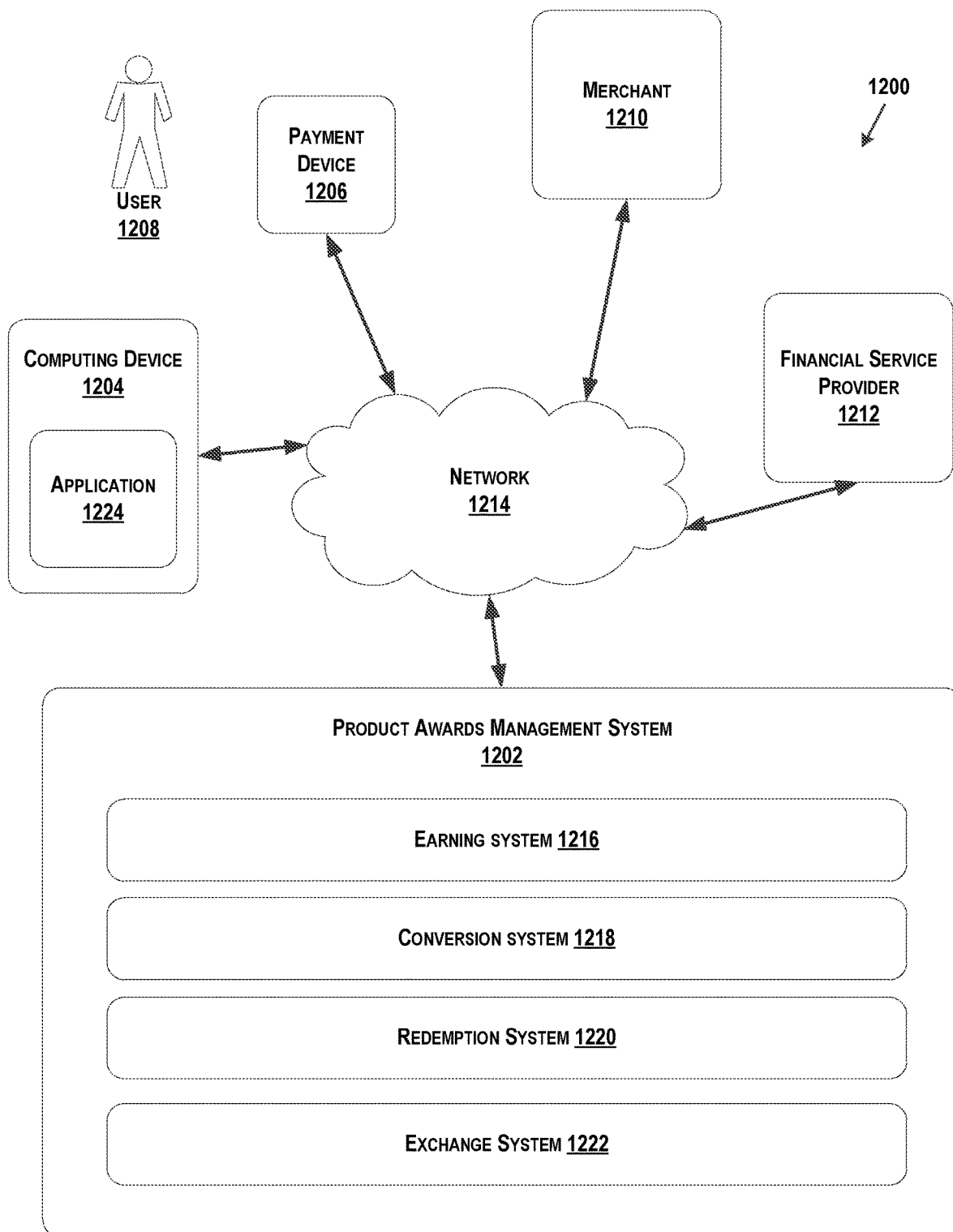
FIG. 12 is a block diagram of an exemplary system configured to regulate generation of units according to at least one encryption technique associated with a blockchain, consistent with disclosed embodiments.

The encryption techniques may serve to regulate generation of the units. Generation of units may be regulated by the encryption technique(s) through, for example, the use of mining. When a new transaction is encrypted, for example, a cryptographic hash of the transaction may be generated. Using the blockchain and the new transaction, an entity may determine ("mine") a value that, when encrypted alongside the transactions in the blockchain and the new transaction, creates a cryptographic hash having certain properties (e.g., a cryptographic hash beginning with a certain number of zeroes). The value may be difficult to discern. Accordingly, the first miner to determine the value may be rewarded with newly generated units. Encrypted data associated with the transaction generating the newly generated units may be entered into the blockchain. Because the encryption techniques are difficult to discern, generation of units may be a slow, steady process. The encryption techniques may further serve to prevent tampering with transactions entered into the blockchain. Because the encryption techniques are difficult to discern, a single entity cannot cause widespread tampering. The encryption techniques FIG. 12 is a block diagram of an exemplary system 1200 configured to regulate generation of units according to at least one encryption technique associated with a blockchain, consistent with disclosed embodiments. As shown in FIG. 12, system 1200 includes a product awards management system 1202, a computing device 1204 and a payment device 1206 associated with a user 1208, a merchant 1210, and a financial service provider 1212, all of which may be communicatively coupled by a network 1214. While only one product awards management system 1202, computing device 1204, payment device 1206, merchant 1210, and financial service provider 1212 are shown, it will be understood that system 100 may include more than one of any of these components. More generally, the components and arrangement of the components included in system 1200 may vary. Thus, system 1200 may include other components that perform or assist in the performance of one or more processes consistent with the disclosed embodiments.

Product awards management system 1202 may be one or more computing devices configured to perform operations consistent with maintaining a plurality of accounts through, for example, an earning system 1216. Earning system 1216 may, for example, be similar to product awards earning system 116 described above. The accounts may take any of the forms described above.

Alternatively or additionally, product awards management system 1202 may be one or more computing devices configured to perform operations consistent with converting product awards to units through, for example, a conversion system 1218. Conversion system 1218 may be configured to determine a real-time conversion rate using, for example, a blockchain and one or more encryption techniques associated with the blockchain. Blockchains are further described below in connection with FIGS. 14A-14B. Conversion is further described below in connection with FIGS. 15, 16, and 17A-B.

Alternatively or additionally, product awards management system 1202 may be one or more computing devices configured to perform operations consistent with redemption of units through, for example, a redemption system 1220. Redemption system 1220 may, for example, be similar to product awards redemption system 118 described above. Redemption is further described below in connection with FIGS. 18, 19, and 20.

Still alternatively or additionally, product awards management system 1202 may be one or more computing devices configured to perform operations consistent with exchange of units through, for example, an exchange system 1222. Exchange system 1222 may be configured to facilitate exchange of units between accounts and/or for product awards and/or currency. For example, exchange system 1222 may be configured to facilitate exchange of units in an account associated with user 1208, computing device 1204, and/or payment device 1206 for units in another account associated with another user, computing device, and/or payment device. As another example, exchange system 1222 may be configured to facilitate exchange of units in an account associated with user 1208, computing device 1204, and/or payment device 1206 for product awards and/or currency. Exchange is further described below in connection with FIGS. 21, 22, and 23A-C.

Still alternatively or additionally, product awards management system 1202 may be configured to perform operations consistent with providing an application 1224 at computing device 1204. Application 1224 may be an application that, when executed at computing device 1204, enables user 1208 to interact with earning system 1216 to create, maintain, and/or view an account and/or earn product awards and/or units in an account. Alternatively, or additionally, application 1224 may be an application that, when executed at computing device 1204, enables user 1208 to interact with conversion system 1216 to convert product awards to units. Still alternatively, or additionally, application 1224 may be an application that, when executed at computing device 1204, enables user 1208 to interact with redemption system 1220 to redeem units in an account for an item of value. Alternatively or additionally, application 1224 may be an application that, when executed at computing device 1204, enables user 1208 to exchange units in an account for product awards and/or currency in another product awards account.

Computing device 1204, payment device 1206, user 1208, merchant 1210, financial service provider 1212, and network 1214 may take any of the forms described above for computing device 104, payment device 106, user 108, merchant 110, financial service provider 112, and network 114, respectively.

Figure 13:
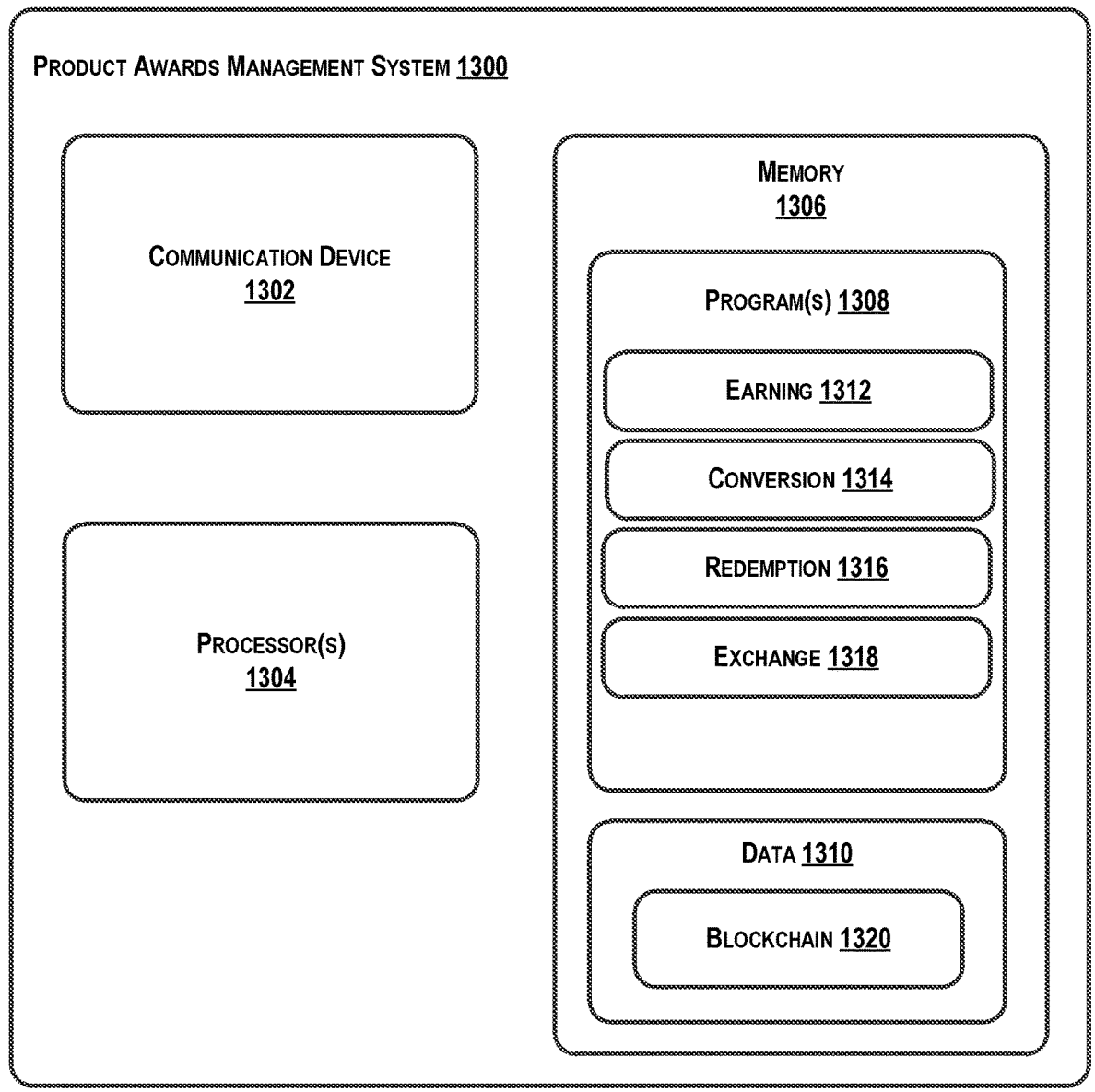
FIG. 13 is a block diagram of an exemplary system configured to regulate generation of units according to at least one encryption technique associated with a blockchain, consistent with disclosed embodiments.

FIG. 13 is a block diagram of an exemplary product awards management system 1300, consistent with disclosed embodiments. As shown, product awards management system 1300 may include a communication device 1302, one or more processor(s) 1304, and memory 1306 including one or more program(s) 1308 and data 1310. Product awards management system 1300 may take the form of a server, general purpose computer, mainframe computer, or any combination of these components. Other implementations consistent with disclosed embodiments are possible as well.

Communication device 1302, processor(s) 1304, memory 1306, program(s) 1308, and data 1310 may take any of the forms described above for communication device 202, processor(s) 204, memory 206, and data 210, respectively.

In certain embodiments, memory 1306 may store sets of instructions for carrying out the processes described below in connection with FIGS. 15, 18, and 21. For example, memory 1306 may store instructions to carry out processes relating to earning 1312, instructions to carry out processes relating to conversion 1314, instructions to carry out processes relating to redemption 1316, and/or instructions to carry out processes relating to exchange 1318. Other instructions are possible as well. In general, instructions may be executed by processor(s) 1304 to perform one or more processes consistent with disclosed embodiments. In certain embodiments, data 1310 may include a blockchain 1320. Product awards management system 1302 may use blockchain 1320 in carrying out processes relating to conversion 1314, redemption 1316, and/or exchange 1318, as described below in connection with FIGS. 15-23A-C.

The components of product awards management system 1300 may be implemented in hardware, software, or a combination of both hardware and software, as will be apparent to those skilled in the art. For example, although one or more components of product awards management system 1300 may be implemented as computer processing instructions, all or a portion of the functionality of product awards management system 1300 may be implemented instead in dedicated electronics hardware.

In some embodiments, product awards management system 1300 may also be communicatively connected to one or more database(s) (not shown). Alternatively, such database(s) may be located remotely from product awards management system 1300. Product awards management system 1300 may be communicatively connected to such database(s) through a network, such as network 1214 described above. Such database(s) may include one or more memory devices that store information and are accessed and/or managed through product awards management system 1300. In some embodiments, blockchain 1320 may be implemented with a database(s). Such database(s) may take any of the forms described above.

Figures 14A, 14B:
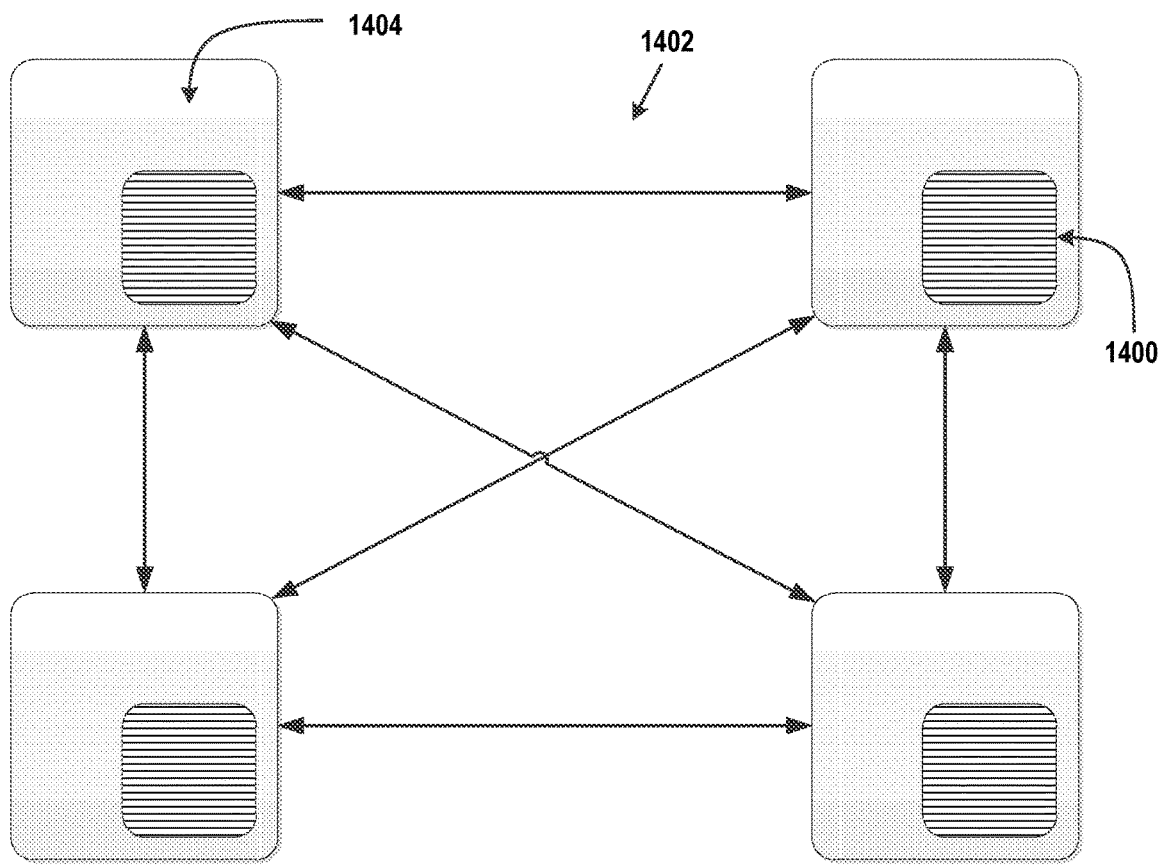
FIGS. 14A-14B illustrate a blockchain, consistent with disclosed embodiments.

FIGS. 14A-14B illustrate a blockchain 1400, consistent with disclosed embodiments. Blockchain 1400 may be a data structure representing a digital ledger of transactions. As shown in FIG. 14A, the transactions entered into the digital ledger may specify a date and time of the transaction as well as participants in the transaction. The participants may include, for example, one or more computing devices, payment devices, merchants, and/or financial service providers, and/or the product awards system.

Blockchain 1400 is a distributed digital ledger. That is, blockchain 1400 is distributed among a network 1402 of participants 1404, as shown in FIG. 14B. The network of participants 1402 may be communicatively coupled to one another, and each participant 1404 in the network 1402 may maintain a copy of the digital ledger of transactions.

Each participant 1404 may be configured to enter transactions involving units into the distributed digital ledger. In some embodiments, the units may correspond to a currency and/or a cryptocurrency, such as bitcoin or Ven. The blockchain 1400 may be associated with at least one encryption technique. The encryption technique(s) may include, for example, hashing techniques, such as a cryptographic hash.

Entry of transactions may be secured by the encryption technique(s). Additionally, each transaction may be traceable through the blockchain 1400. When a participant 1404 proposes to enter a transaction into the digital ledger, each remaining participant 1404 may verify the proposed transaction with reference to the digital ledger maintained by the remaining participant 1404. If a sufficient number of the remaining participants agree, the proposed transaction may be entered into each digital ledger, thereby forming a new block added to blockchain 1400.

Figure 15:
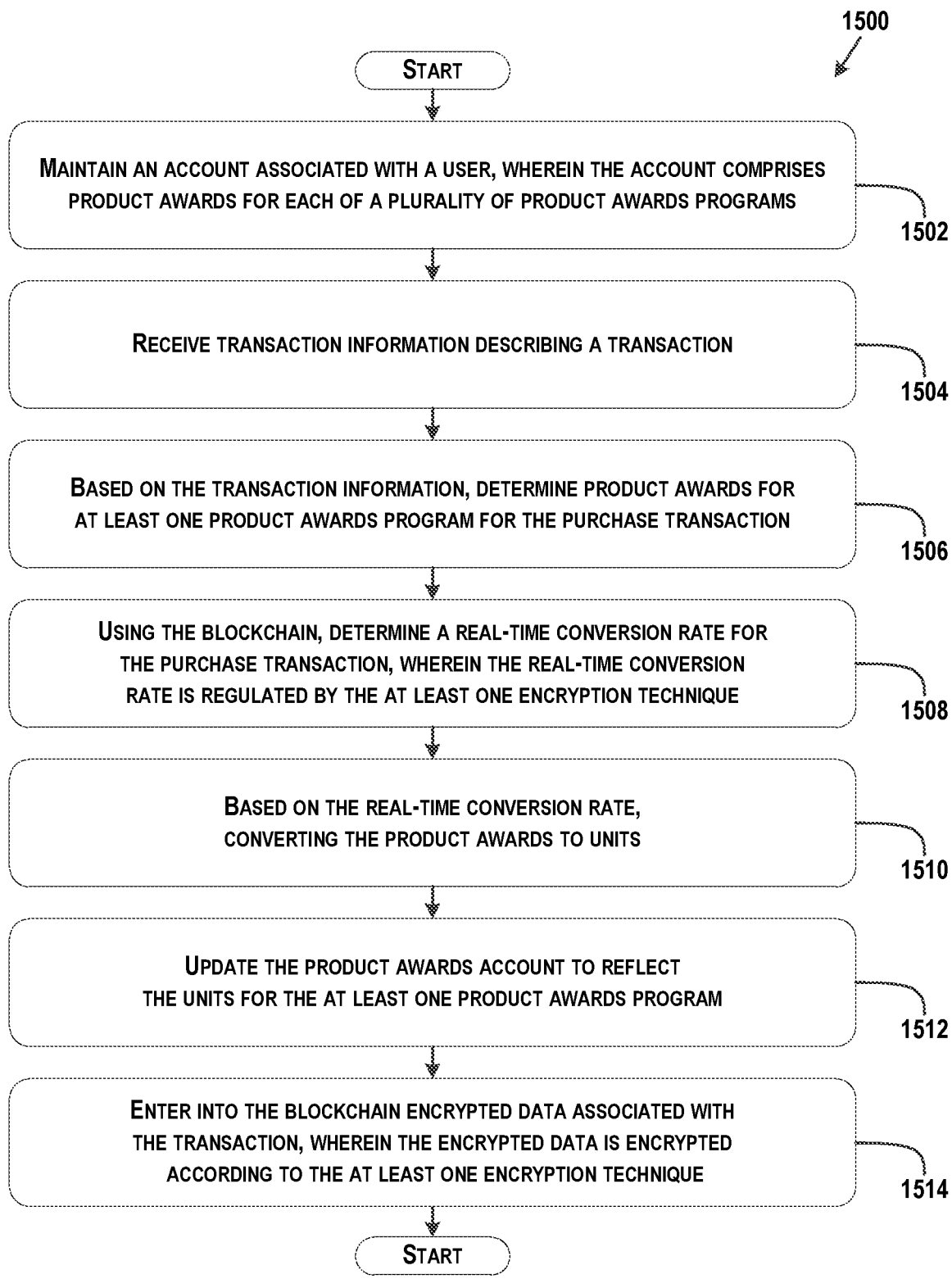
FIG. 15 is a flowchart of an exemplary conversion process, consistent with disclosed embodiments.

FIG. 15 is a flowchart of an exemplary conversion process 1500, consistent with disclosed embodiments. In some embodiments, conversion process 1500 may be carried out by a product awards management system, such as product awards management systems 1202 and 1300 described above.

As shown, conversion process 1500 includes, at block 1502, maintaining an account associated with a user. The account may include product awards for each of a plurality of product awards programs. For example, referring back to FIG. 12, product awards management system 1202 may maintain an account for user 108. The account may include, for example, product awards for a product awards program associated with, for example, merchant 1210 and product awards for a product awards program associated with, for example, financial service provider 1212. For instance, the accounts may include product awards for an "Airline Awards" product awards program and/or product awards for a "Hotel Awards" product awards program.

Conversion process 1500 further includes, at block 1504, receiving transaction information describing a transaction. The transaction information may include, for example, an indication of a transaction conducted by the user using a payment device at a merchant. For example, referring back to FIG. 12, product awards management system 1202 may receive an indication of a transaction conducted by user 1208 using payment device 1206 at merchant 1210. The product awards management system may receive the transaction information from, for example, the user, the payment device, the merchant, a computing device associated with the user, and/or a financial service provider. For example, the user may provide the transaction information to the product awards management system through, for example, an application executed on a computing device, such as application 1224 described above. The user may, for instance, take a photograph of a receipt, display, or other evidence of the transaction and upload the photograph to the product awards management system using the application. As another example, for a transaction authorized by the financial service provider, the merchant and/or the financial service provider may provide the transaction information to the product awards management system when the transaction is authorized.

At block 1506, conversion process 1500 includes, based on the transaction information, determining product awards for at least one product awards program for the transaction. For example, the product awards may be determined based on at least one of the transaction, the payment device, and the merchant. The product awards may be determined in any of the manners described above for block 306 in connection with FIG. 3.

At block 1508, conversion process 1500 further includes, using the blockchain, determining a real-time conversion rate for the transaction. The real-time conversion rate may be regulated by the at least one encryption technique. For example, the real-time conversion rate may reflect a real-time valuation of the product awards in the at least one product awards program as evidenced by transactions, entered as encrypted data, in the blockchain. The real-time conversion rate may be product awards program specific, such that product awards in one product awards program may have a different real-time conversion rate than product awards in another product awards program. The real-time conversion rate may also be time specific, such that the real-time conversion rate for product awards in a product awards program at one time may be different than at another time.

The real-time conversion rate may reflect, for example, a supply and/or demand of the units and/or a supply and/or demand of the product awards. The conversion rate may be determined based on, for example, some or all of the transactions included in the blockchain, such as some or all transactions involving the product awards and/or the units and/or some or all transactions entered in the blockchain within a period of time. For instance, the real-time conversion rate may reflect transactions in the blockchain in which the product awards were previously exchanged for units, currency, and/or for product awards in other product awards programs. Alternatively, the conversion rate may be a fixed conversion rate.

At block 1510, conversion process 1500 further includes, based on the real-time conversion rate, converting the product awards to units. Where the at least one product awards program includes more than one product awards program, the product awards may be converted according to the real-time conversion rate for each product awards' product awards program.

Conversion process 1500 further includes, at block 1512, updating the account to reflect the units for the at least one product awards program. For example, the product awards management system 1502 may update the user's account to add the units determined in block 1510. An example conversion process is further described in connection with FIGS. 16 and 17A-17B.

Conversion process 1500 further includes, at block 1514, entering into the blockchain encrypted data associated with the transaction. The encrypted data may be encrypted according to the at least one encryption technique. The encrypted data associated with the transaction may indicate, for example, the computing device, the product awards, the product awards program, and/or the units. The transaction may take any of the forms described above in connection with FIGS. 14A-14B.

Figure 16:
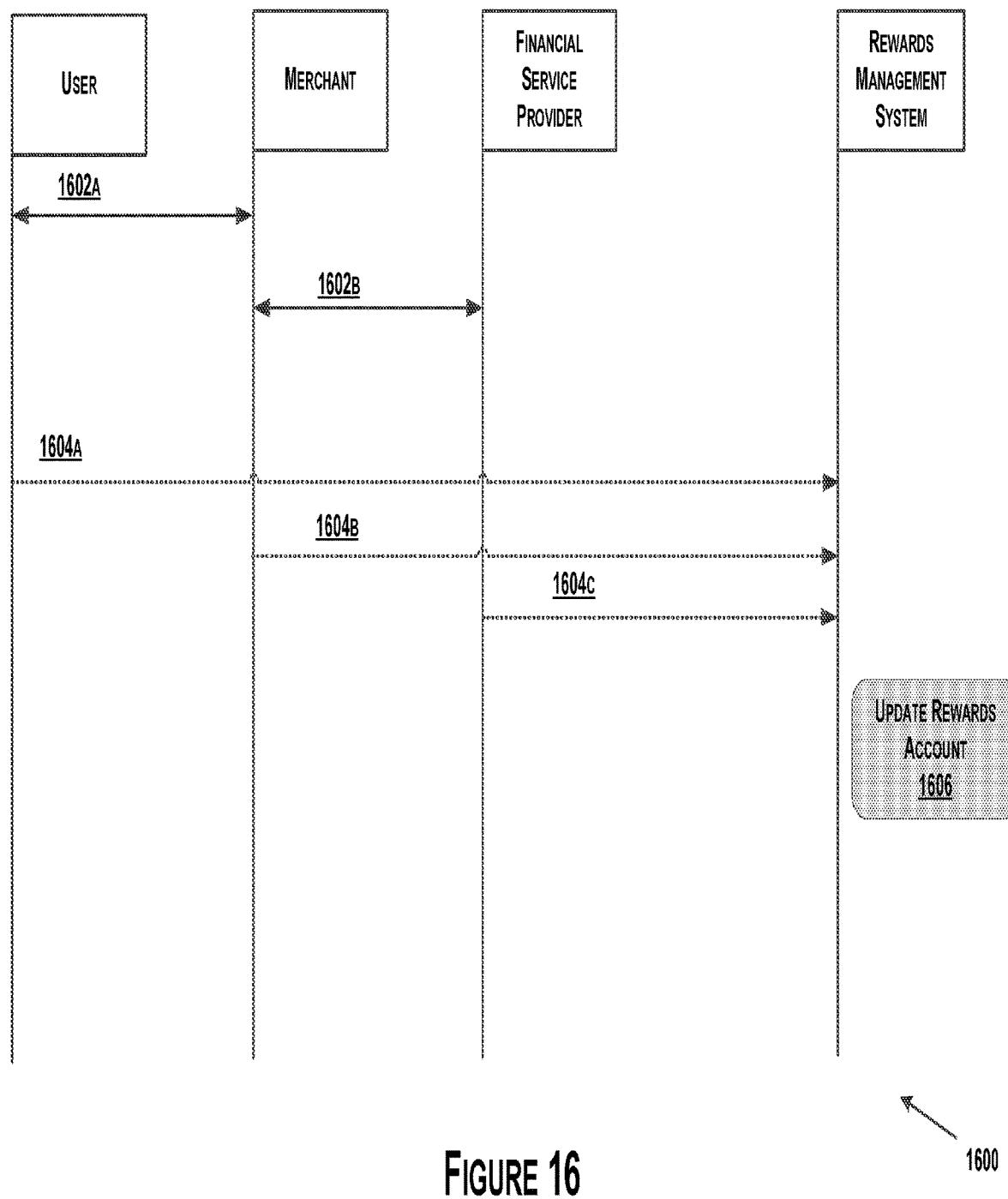
FIG. 16 illustrates message flow in an exemplary conversion process, consistent with disclosed embodiments.

FIG. 16 illustrates message flow 1600 in an exemplary earning process, consistent with disclosed embodiments. FIGS. 17A-17 illustrate an account 1700 in an exemplary earning process, consistent with disclosed embodiments. As shown in FIG. 16, the message flow 1600 begins with message(s) 1602A through which a user conducts a transaction with a merchant. For example, a user may use a computing device and/or a payment device to make payment for an item of value offered by the merchant.

With message(s) 1602B, the merchant may seek authorization of the transaction from a financial service provider maintaining a financial services account associated with the user, and the financial service provider may authorize the transaction. Once the transaction has been authorized, the product awards management system may receive an indication of the transaction. The indication may indicate, for example, the user, the payment device and/or computing device used to conduct the transaction, the merchant, the financial service provider, the payment, and/or the item of value.

In some embodiments, the product awards management system may receive the indication from the user, as shown with message(s) 1604A. For example, the indication may take the form of a photograph or other data captured by the user using, for example, the computing device, and the indication may be provided to the product awards management system through, for example, an application executed at the computing device. Alternatively or additionally, in some embodiments the product awards management system may receive the indication from the merchant, as shown with message(s) 1604B. For example, the merchant may provide the indication to the product awards management system after the transaction is authorized. Still alternatively or additionally, in some embodiments the product awards management system may receive the indication from the financial service provider, as shown with message(s) 1604C. For example, the financial service provider may provide the indication to the product awards management system after the transaction is authorized. The product awards management system may receive the indication in other manners as well.

Following message(s) 1604A, 1604B, and/or 1604C, the product awards management system may update the account for the user to reflect the units (1606). As shown in FIG. 17A, updating the account 1700 may involve, for example, updating the product awards 1704 for at least one product awards program 1702 in the account. As shown, the product awards programs 1702 may include, for example, an "Airline Awards" product awards program, a "Hotel Awards" product awards program, and a "Payment Device Awards" product awards program.

Prior to the update, for instance, as shown in FIG. 17A, the account 1700 may show product awards having a value of 112,000 for an "Airline Awards" product awards program, product awards having a value of 36,000 for a "Hotel Awards" product awards program, and product awards having a value of 15,280 for a "Payment Device Awards" product awards program. Following the update, as shown in FIG. 17B, the product awards for the "Airline Awards" product awards program may be unchanged. This may be because, for example, the underlying transaction does not qualify for product awards under the "Airline Awards" product awards program. The product awards for the "Hotel Awards" product awards program and for the "Payment Device Awards" product awards program, by contrast, may be updated. For instance, as shown, to the "Hotel Awards" product awards may be added units 1706 having a value of 38.50, while to the "Payment Device Awards" product awards program may be added units 1706 having a value of 88.02.

In some embodiments, the account 1700 may include both product awards 1704 and units 1706. A user may, for example, be given the option of converting some or all earned product awards to units, either at the time the product awards are earned or at a later time, according to a real-time conversion rate, as described above. Alternatively, in some embodiments the account 1700 may include only units 1706, and all product awards 1704 in the account 1700 may be converted to units 1706. In some embodiments, the product awards management system may notify the user, computing device, merchant, and/or financial service provider of the update to the account.

In some embodiments, in addition to updating the account associated with the user, the product awards management system may update the blockchain to reflect the transaction. For example, the product awards management system may enter the transaction into the blockchain. The transaction may specify, for instance, the user, the merchant, the payment, and/or the item of value, as well as a date and/or time for the transaction. Alternatively or additionally, the product awards management system may update the blockchain to reflect the earned units. For example, for units in a product awards program associated with a product awards issuer (e.g., a merchant and/or a financial service provider), the product awards management system may enter a transaction into the blockchain specifying the user, the product awards issuer, the units, and/or a date and/or time for the transaction. The transaction may indicate, for instance, that the units were transferred from the product awards issuer to the user.

Figure 18:
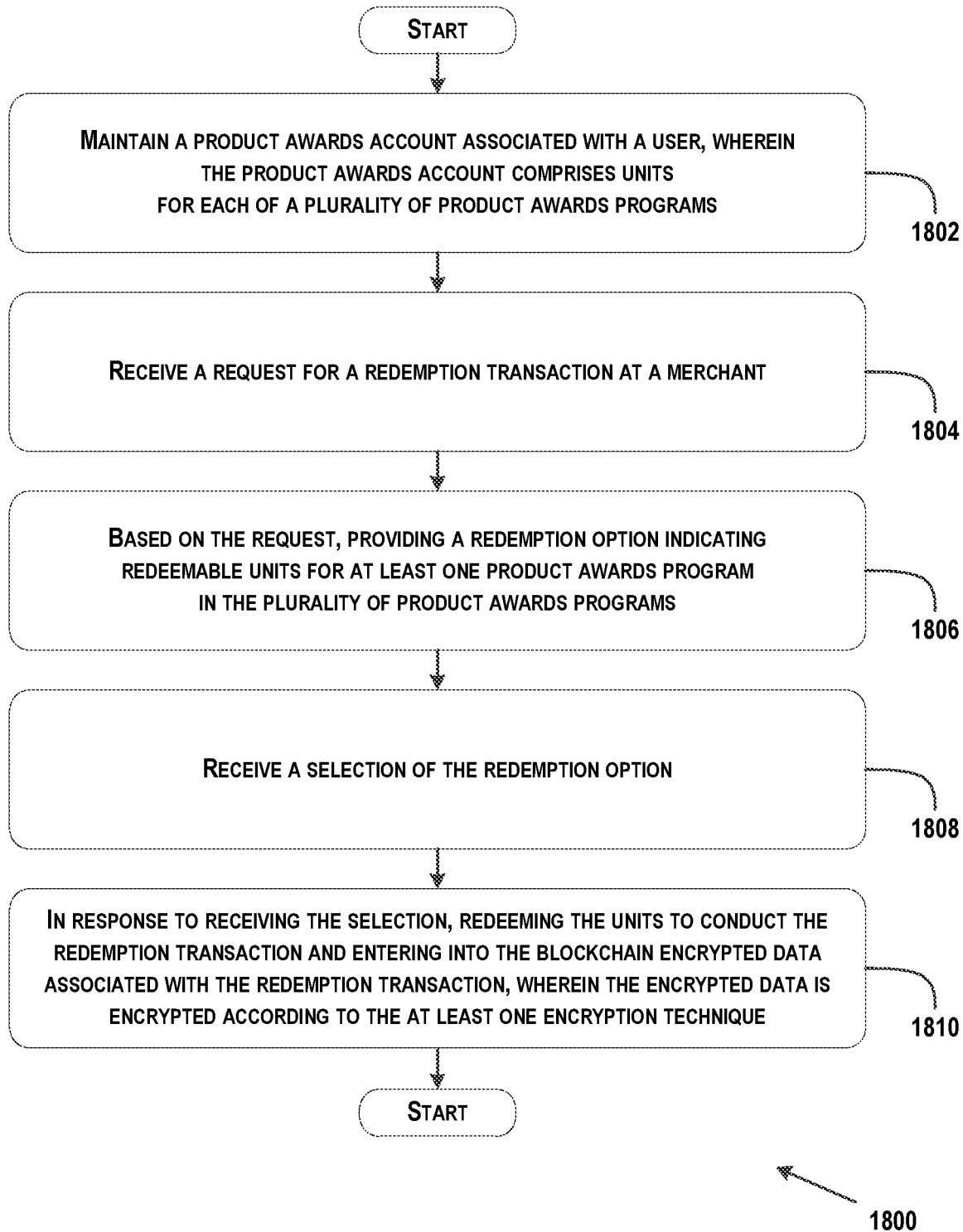
FIG. 18 is a flowchart of an exemplary redemption process, consistent with disclosed embodiments.

FIG. 18 is a flowchart of an exemplary redemption process, consistent with disclosed embodiments. In some embodiments, redemption process 1800 may be carried out by a product awards management system, such as product awards management systems 1202 and 1300 described above. The product awards management system may be configure for regulating generation of units according to at least one encryption technique associated with a blockchain, as described above.

As shown, redemption process 1800 includes, at block 1802, maintaining an account associated with a user. The account may include units for each of a plurality of product awards programs. For example, referring back to FIG. 12, product awards management system 1202 may maintain an account for user 1208. The account may include units for a product awards program associated with, for example, merchant 1210 and units for a product awards program associated with, for example, financial service provider 1212. For instance, the account may include units for an "Airline Awards" product awards program and/or product awards for a "Hotel Awards" product awards program. Other product awards programs are possible as well.

Redemption process 1800 continues at block 1804 with receiving a request for a redemption transaction at a merchant. The redemption transaction may be any transaction in which units, alone or in combination with product awards and/or currency, are redeemed for an item of value. For example, a redemption transaction may involve a user redeeming units, alone or in combination with product awards and/or currency, to purchase an item of value from a merchant.

The request for the redemption transaction may be received from, for example, the user. For example, the user may request, through an application on a computing device, to redeem units for an item of value from a merchant. Alternatively or additionally, the request for the redemption transaction may be received from, for example, a merchant. For example, the merchant may offer to the user to redeem units for an item of value from the merchant, and the user may accept the offer. In response to the user's acceptance, the merchant may provide the request for the redemption transaction to the product awards management system.

At block 1806, the redemption process 1800 includes, based on the request, providing a redemption option. The redemption option may indicate redeemable units from at least one product awards program in the plurality of product awards programs. Redeemable units may be deducted from a product awards program in exchange for an item of value from the merchant.

For example, the redemption option may indicate that the user may redeem a value of units from a "Dining Awards" product awards program to purchase the item of value from the merchant. As another example, the redemption option may indicate that the user may redeem a value of units from a "Dining Awards" product awards program in combination with a value of product awards from an "Airline Awards" product awards program to purchase the item of value from the merchant. As still another example, the redemption option may indicate that the user may redeem a value of units from a "Payment Device Awards" product awards program in combination with a value of currency to purchase the item of value from the merchant. In some embodiments, the redemption option may include more than one option. For example, the redemption option may include each of the examples described above.

The redemption option may be provided to the user (e.g., through the application on the computing device) and/or may be provided to the merchant. Where the redemption option is provided to the merchant, the merchant may present the redemption option to the user. For example, in a physical retail environment, the merchant may present the redemption option to the user through a point-of-sale terminal. As another example, in an online retail environment, the merchant may present the redemption option the user through a pop-up notification in a web browser application. Other examples are possible as well.

The redemption process 1800 includes, at block 1808, receiving a selection of the redemption option. The selection may be received from, for example, the user (e.g., through the application on the computing device). Alternatively or additionally, the merchant may receive the selection from the user, and the merchant provide the selection to the product awards management system. For example, in a physical retail environment, the merchant may receive the selection through a point-of-sale terminal. As another example, in an online retail environment, the merchant may receive the selection through a pop-up notification in a web browser application. Other examples are possible as well.

At block 1810, the redemption process 1800 includes, in response to receiving the selection, redeeming the redeemable units to conduct the redemption transaction and entering into the blockchain encrypted data associated with the redemption transaction. The encrypted data may be encrypted according to the at least one encryption technique.

Redeeming the redeemable units to conduct the redemption transaction may involve, for example, transferring the redeemable units from the at least one product awards program to the merchant and transferring the merchant's item of value to the user.

Entering into the blockchain encrypted data associated with the redemption transaction may involve, for example, entering into the blockchain encrypted data specifying the account, the merchant, the redeemable units, the item of value, and the date and time of the redemption transaction. The transaction may indicate, for example, that the redeemable units were transferred to the merchant and the item of value was transferred to the user. In some embodiments, the redemption transaction may further include, in addition to transferring the redeemable units, the user providing product awards and/or currency in combination with the redeemable units. In these embodiments, the transaction entered into the blockchain may further specify the product awards and/or the currency. An example redemption process is further described in connection with FIGS. 19 and 20A-20C.

Figure 19:
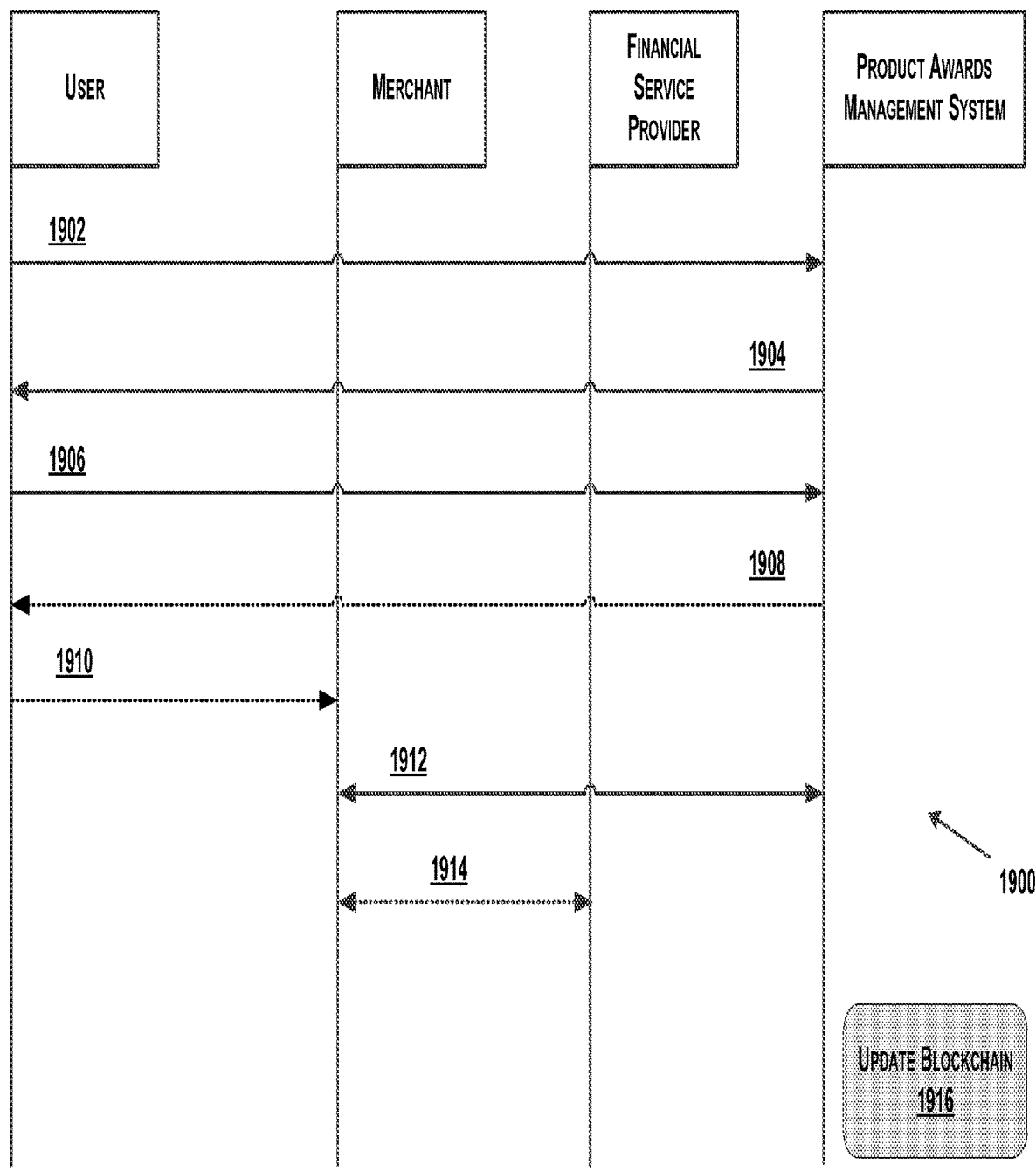
FIG. 19 illustrates message flow in an exemplary redemption process, consistent with disclosed embodiments.
Figure 20A:
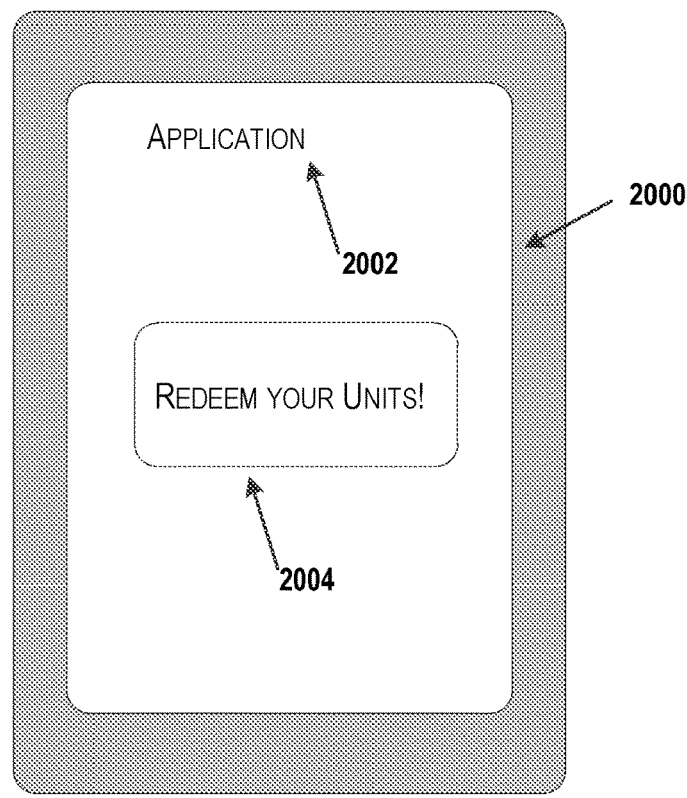
FIGS. 20A-20C illustrate a blockchain in an exemplary redemption process, consistent with disclosed embodiments.
Figure 20B:
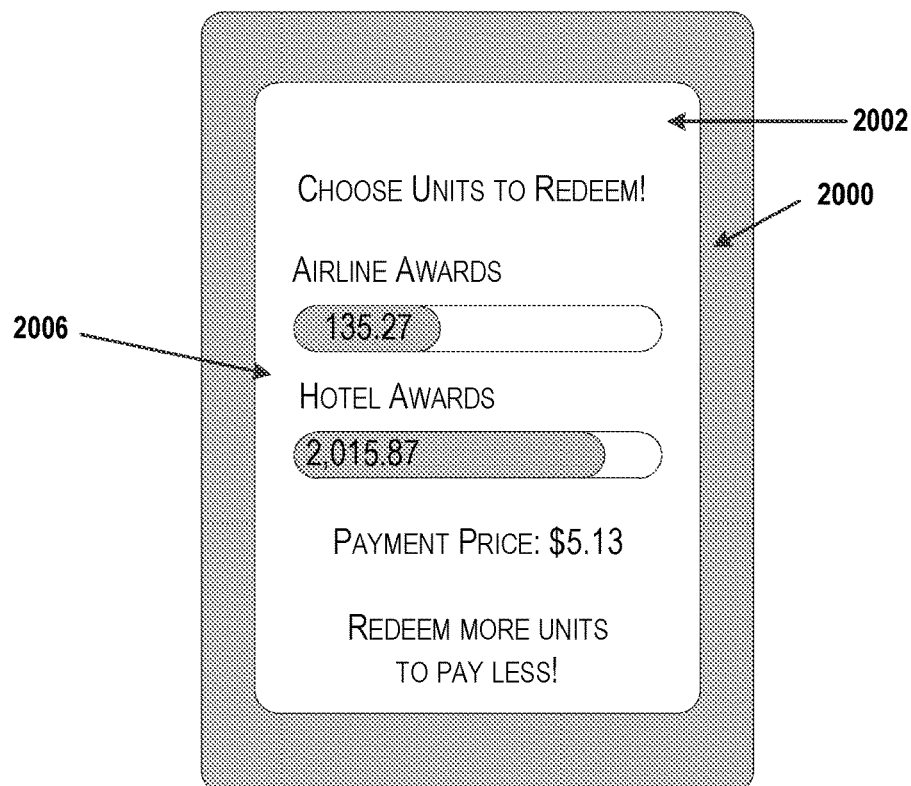
Figure 20C:
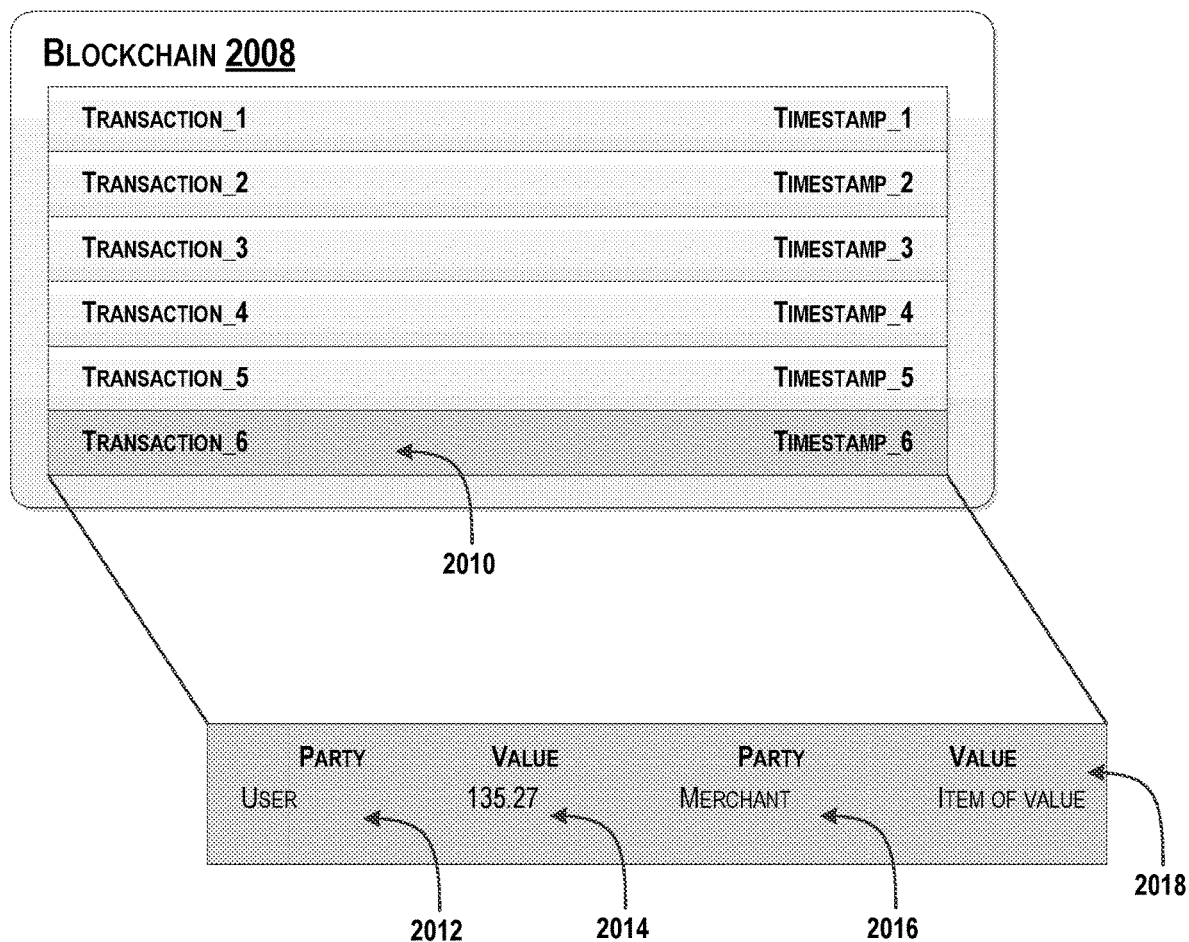

FIG. 19 illustrates message flow 1900 in an exemplary redemption process, consistent with disclosed embodiments. FIGS. 20A-20C illustrate an application and a blockchain in an exemplary redemption process, consistent with disclosed embodiments. As shown in FIG. 19, the message flow 1900 begins with message(s) 1902, with which a user requests a redemption transaction from product awards management system. In some embodiments, the user may request the redemption transaction through an application 2002 executed on a computing device 2000, as shown in FIG. 20A. For example, the user may select a selection 2004 to "Redeem Your Units!" in the application 2002. The computing device 2000 may provide the request to the product awards management system.

In response to receiving the request, the product awards management system provides a redemption option to the computing device with message(s) 1904. An example redemption option 2006 is shown in FIG. 20B. The redemption option 2006 may specify units from one or more product awards programs associated with the user that may be redeemed to purchase the item of value. In some embodiments, the application 2002 may permit a user to vary units from one or more product awards programs to view various redemption options. For example, a user may increase units from one product awards program while decreasing units from another. As another example, a user may increase units from a product awards program to decrease a payment price. Other examples are possible as well. In some embodiments, the redemption option may include a combination of units with product awards and/or currency. The user may select the redemption option through the application, as shown by message(s) 1906.

In some embodiments, in response to receiving the selection of the redemption option, the product awards management system may provide to the user a redemption certificate with message(s) 1908. The redemption certificate may take the form of, for example, a bar code, two-dimensional bar code (e.g., QR code), or alphanumeric code for display in the application. Other redemption certificates are possible as well. The user may, with message(s) 1910, provide the redemption certificate to the merchant to conduct the redemption transaction.

With message(s) 1912, the merchant may conduct the redemption transaction with the product awards management system. In embodiments where the redemption option involved a combination of redeemable product awards and currency, the merchant may additionally conduct a transaction with the financial service provider with message(s) 1914 for the amount of currency indicated in the redemption option. In these embodiments, the currency may be provided using, for example, a payment device and/or cash.

The product awards management system may add the redemption transaction to the blockchain at 1916. The transaction may specify, among other things, the units and the item of value from the merchant. In embodiments where the redemption option involved a combination of redeemable units and product awards and/or currency, the redemption transaction added to the blockchain may specify the product awards and/or currency as well.

An example transaction entry into the blockchain is shown in FIG. 20C. As shown, a transaction 2010 is entered into blockchain 2008. The transaction 2010 may specify, for example, the user 2012, the units 2014, the merchant 2016, and the item of value 2018. The item of value 2018 may be indicated by, for example, a value of the item of value provided in units, currency, or another medium of exchange. In embodiments where the redemption option involved a combination of redeemable units, product awards, and/or currency, the transaction 2010 may further specify the product awards and/or currency.

Figure 21:
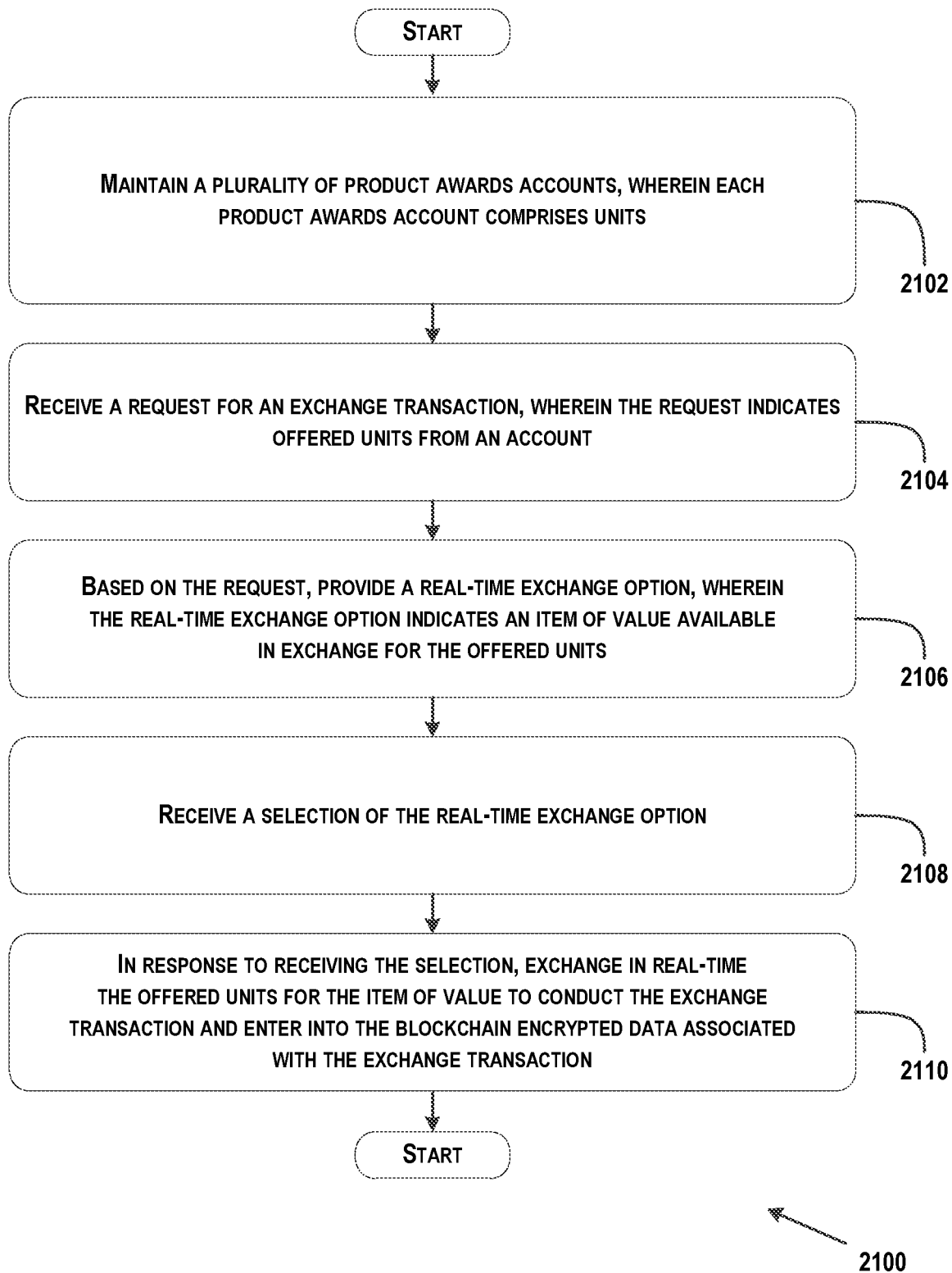
FIG. 21 is a flowchart of an exemplary exchange process, consistent with disclosed embodiments.

FIG. 21 is a flowchart of an exemplary exchange process 2100, consistent with disclosed embodiments. In some embodiments, exchange process 2100 may be carried out by a product awards management system, such as product awards management systems 1202 and 1300 described above.

As shown, exchange process 2100 includes, at block 2102, maintaining a plurality of product awards accounts. Each product awards account may include units. In some embodiments, each product awards account may include units for each of a plurality of product awards programs. For example, referring back to FIG. 12, product awards management system 1202 may maintain an account for user 1208. The account may include units for a product awards program associated with, for example, merchant 1210 and units for a product awards program associated with, for example, financial service provider 1212. For instance, the accounts may include product awards for an "Airline Awards" product awards program and/or product awards for a "Hotel Awards" product awards program.

Exchange process 2100 continues at block 2104 with receiving a request for an exchange transaction. The request may indicate offered units from an account. The exchange transaction may be any transaction in which units are exchanged for other units, product awards, and/or currency. For example, an exchange transaction may involve a first user exchanging units for a first product awards program for a second user's units and/or product awards for a second product awards program. As another example, an exchange transaction may involve a use exchanging units for currency at a financial institution. Other examples are possible as well. The request may be received from the user through, for example, the application executed at the computing device.

At block 2106, the exchange process 2100 may include, based on the request, providing a real-time exchange option. The real-time exchange option may indicate an item of value currently available in exchange for the offered units. The item of value may be, for example, units from another product awards account, product awards from another account, and/or currency. The item of value may be available from another user, a merchant, a financial service provider, and/or another entity. In some embodiments, the exchange option may include more than one option. The exchange option may be provided to the user (e.g., through the computing device)

The exchange process 2100 includes, at block 2108, receiving a selection of the real-time exchange option. The selection may be received from, for example, the user (e.g., through the application on the computing device).

At block 2110, the redemption process 2100 includes, in response to receiving the selection, exchanging in real-time the offered units for the item of value to conduct the exchange transaction and entering into the blockchain encrypted data associated with the exchange transaction.

Exchanging the offered units for the item of value may involve, for example, transferring the offered units from the user to an entity offering the item of value and transferring the item of value from the entity offering the item of value to the user. The exchangeable product awards may be exchanged in other manners as well.

Entering into the blockchain encrypted data associated with the exchange transaction may involve, for example, entering into the blockchain encrypted data specifying the account, the entity providing the item of value, the offered units, the item of value, and the date and time of the offered transaction. The encrypted data may indicate, for example, that the offered units were transferred to the entity providing the item of value and the item of value was transferred to the user. An example exchange process is further described in connection with FIGS. 22 and 23A-20C.

Figure 22:
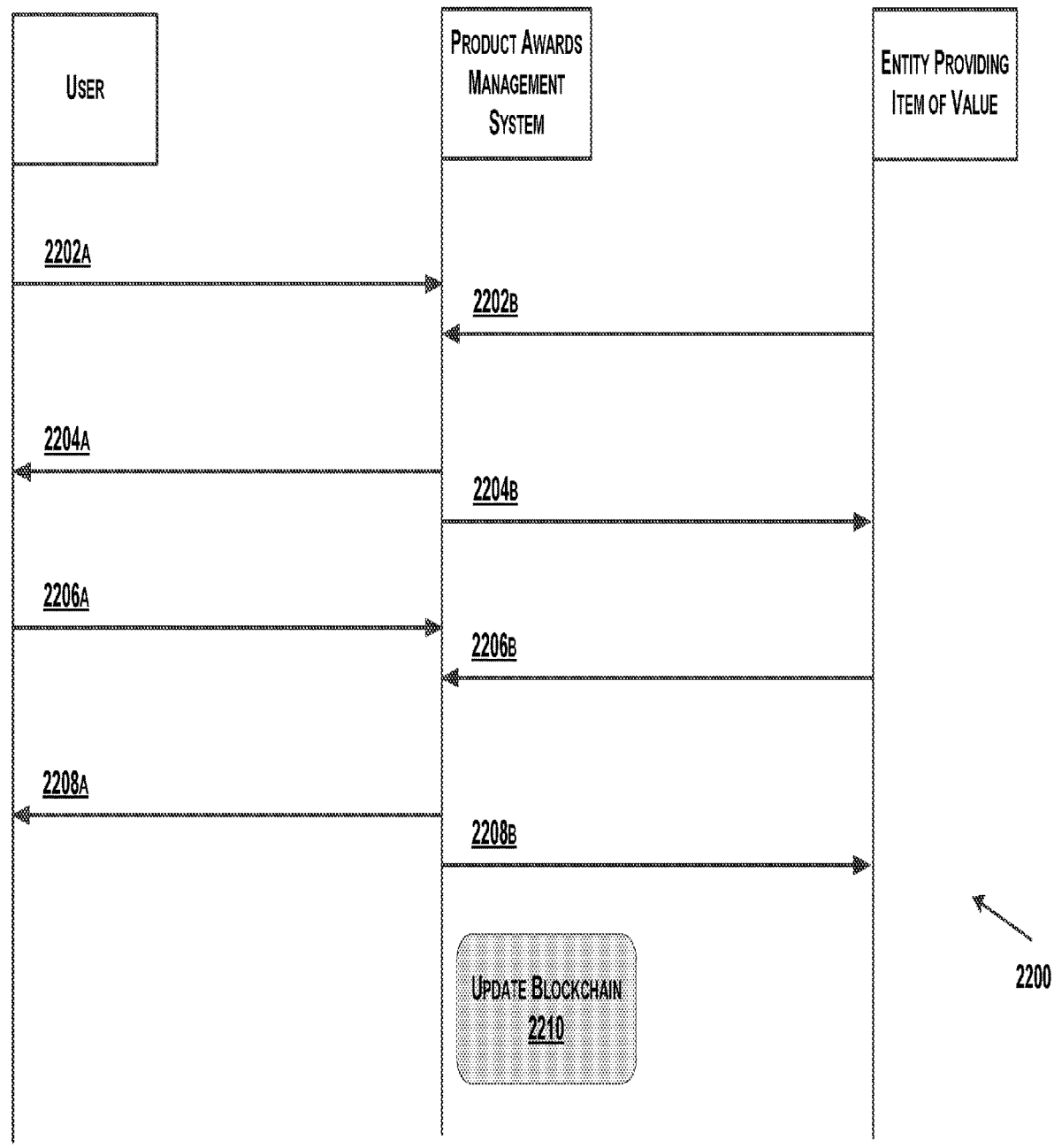
FIG. 22 illustrates message flow in an exemplary exchange process, consistent with disclosed embodiments.
Figure 23A:
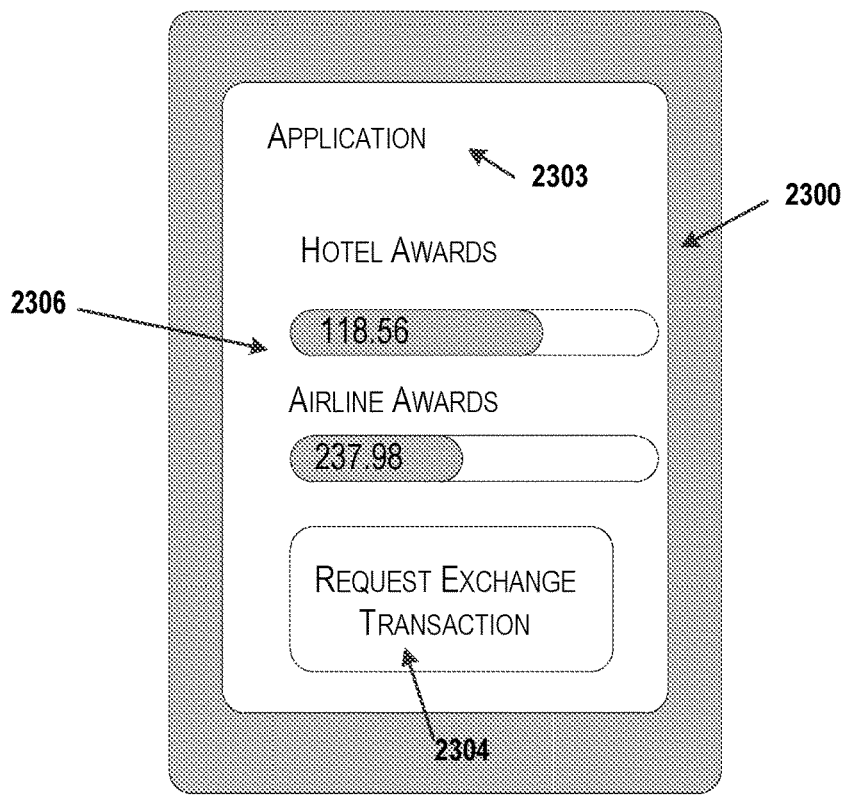
FIGS. 23A-23C illustrate an application and a blockchain in an exemplary exchange process, consistent with disclosed embodiments.
Figure 23B:
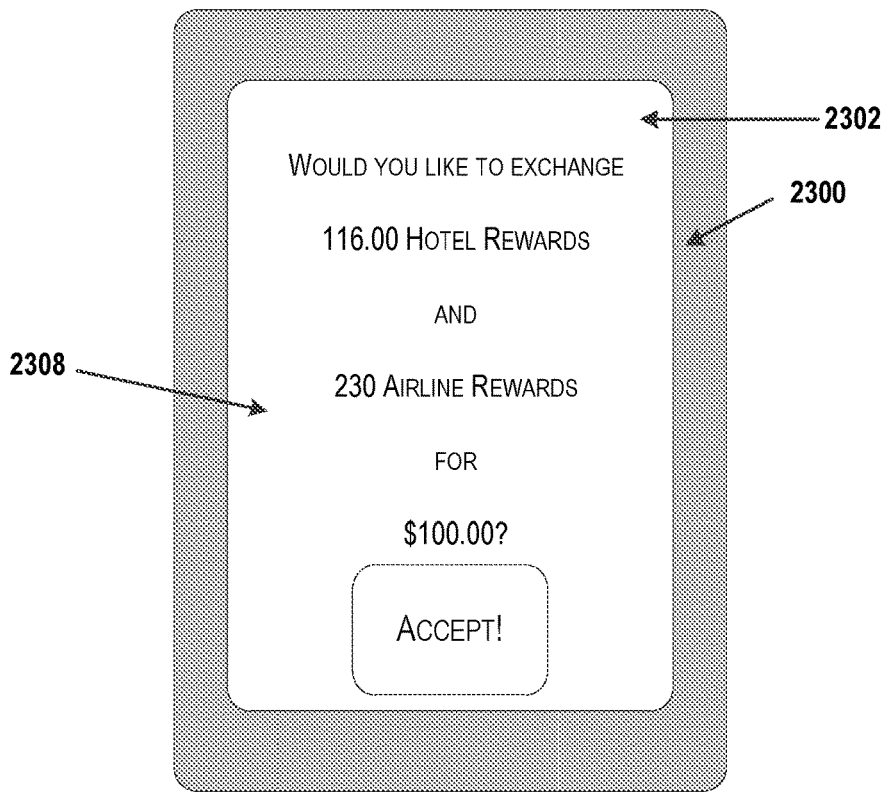
Figure 23C:
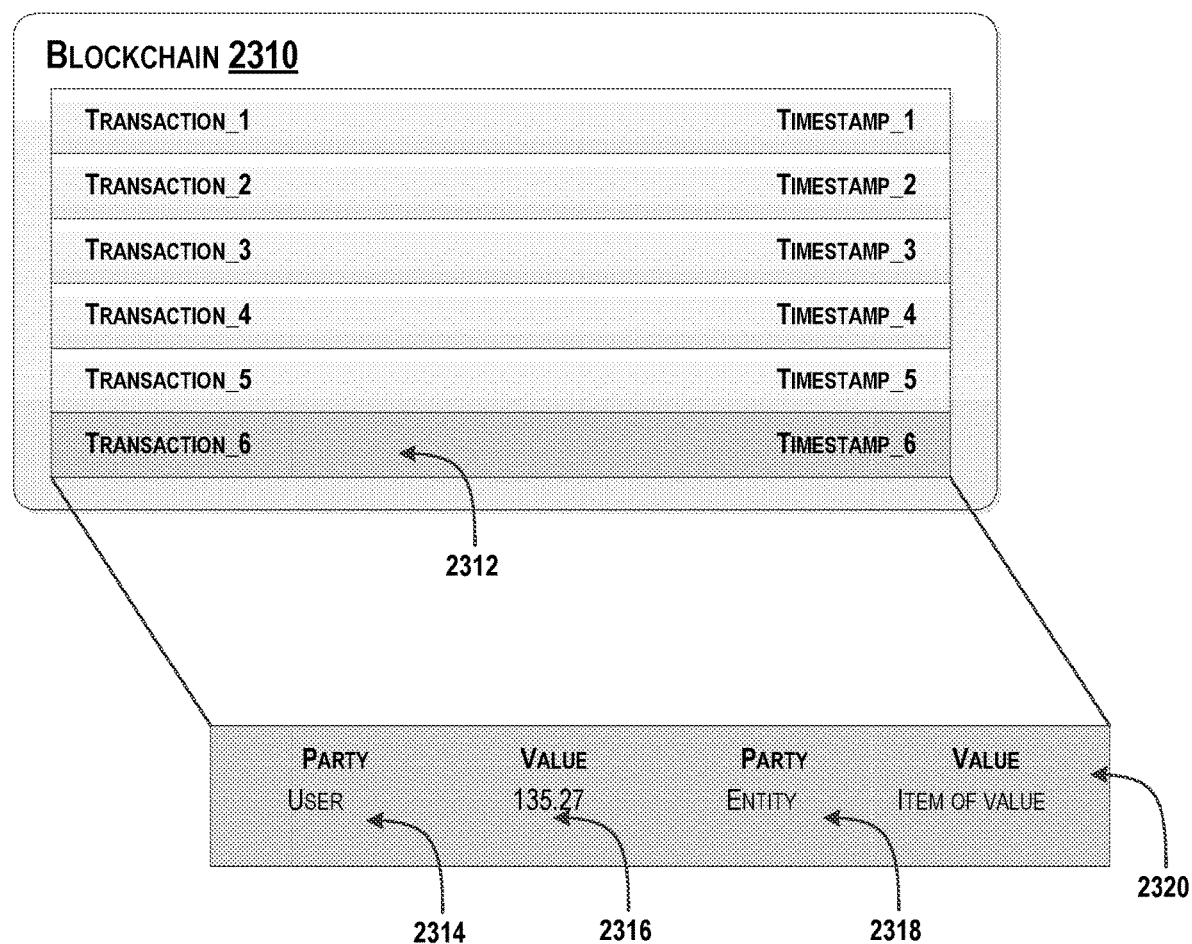

FIG. 22 illustrates message flow in an exemplary exchange process 2200, consistent with disclosed embodiments. FIGS. 23A-23C illustrate an application and a blockchain 2300 in an exemplary exchange process, consistent with disclosed embodiments. As shown in FIG. 22, the message flow 2200 begins with message(s) 2202A, with which the user requests an exchange transaction from product awards management system. The request for the exchange transaction may indicate, for example, offered units in an account associated with the first computing device. In some embodiments, the user may request the exchange transaction through an application, such as application 2302 executed on computing device 2300 in FIG. 23A. The user may indicate the offered units 2306 through the application 2302, as shown.

With message(s) 2202B, the product awards management system may receive from an entity offering an item of value an offer to exchange the item of value in an exchange transaction. The offer may specify, for example, a value and/or range of values of units for which the entity is willing to transfer the item of value. The item of value may be any of units, product awards, and/or currency.

The product awards management system may provide a real-time exchange option to the user with message(s) 2204A. The real-time exchange option may indicate the item of value available in exchange for the offered units. In some embodiments, the product awards management system may further provide a real-time exchange option to the entity providing the item of value with message(s) 2204B, which may indicate the units are available in exchange for the item of value The exchange option may be selected by the user with message(s) 2206A. In some embodiments, the exchange option may also be accepted by the entity providing the item of value with message(s) 2206B. An example exchange option 2308 is shown in FIG. 23B in an application 2302 executed on a computing device 2300. In some embodiments, the user may select the exchange option by choosing to "Accept!".

With message(s) 2208A and 2208B, the product awards management system may exchange in real-time the offered units for the item of value. At 2210, the product awards management system may update a blockchain associated with the units to reflect the exchange transaction. The exchange transaction may specify, among other things, the user, the offered units, the item of value, the entity providing the item of value, and a time and/or date for the exchange transaction.

An example transaction entry into the blockchain 2310 is shown in FIG. 23C. The transaction 2312 may specify, for example, the user 2314, the units 2316, the entity providing the item of value 2318, and the item of value 2320. The item of value 2320 may be indicated by, for example, a value of the item of value provided in cryptocurrency, another currency, or another medium of exchange. In embodiments where the redemption option involved a combination of redeemable units, product awards, and/or currency, the transaction 2312 may further specify the product awards and/or currency.

Figure 24:
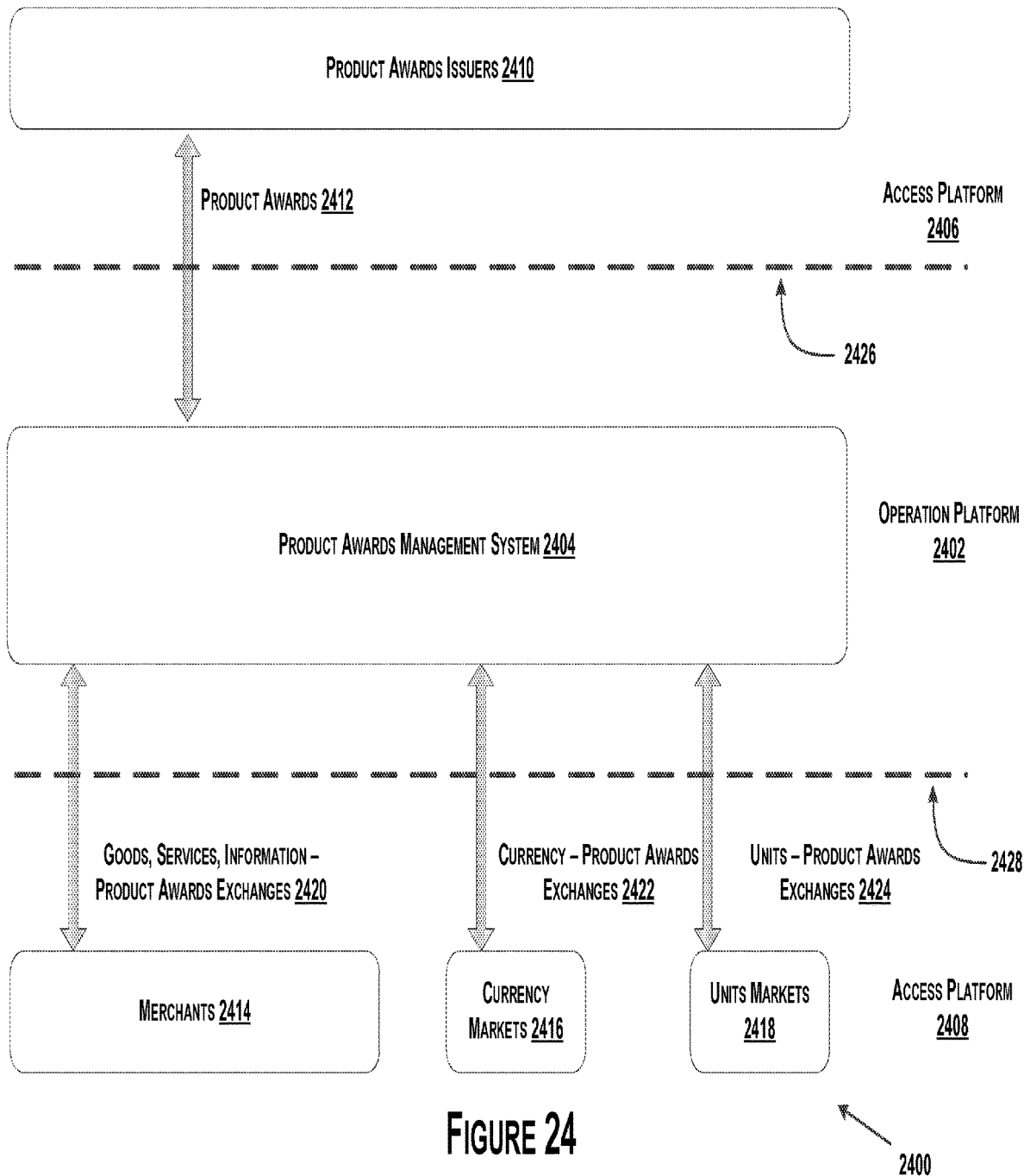
FIG. 24 illustrates an exemplary architecture for a system configured to regulate generation of units according to at least one encryption technique associated with a blockchain, consistent with disclosed embodiments.

FIG. 24 illustrates an exemplary architecture for a system 2400 configured to regulate generation of units according to at least one encryption technique associated with a blockchain, consistent with disclosed embodiments. As shown, system 2400 may include an operation platform 2402. Operation platform 2402 may be configured to maintain a plurality of accounts and/or a blockchain through, for example, product awards management system 2404. In some embodiments, product awards management system 2404 may include hierarchical data storage that facilitates efficient lookup and aggregation of data, such as data pertaining to accounts and/or a blockchain. In some embodiments, raw data may be sourced, cleansed, and transformed using extract, transform, load (ETL) tools before being stored in the product awards management system 2400.

System 2400 may further include access platforms 2406 and 2408. Each access platform 2406, 2408 may be configured to permit access to operation platform 2402. For example, access platform 2406 may permit access to operation platform 2402 by one or more product awards issuers 2410. Product awards issuers 2410 may include entities associated with product awards programs through which product awards 2412 may be earned, such as merchants and/or financial service providers. As another example, access platform 2408 may permit access to operation platform 2402 by one or more merchants 2414, currency markets 2416, and/or units markets 2418. Merchants 2414 may be configured to provide goods, services, and/or information that may be exchanged for product awards at product awards management system 2404 through, for example, goods, services, information—product awards exchanges 2420. Alternatively or additionally, currency markets 2416 may be configured to provide currency that may be exchanged for product awards at product awards management system 2404 through, for example, currency—product awards exchanges 2422. Still alternatively or additionally, units markets 2418 may be configured to provide units that may be exchanged for product awards at product awards management system 2404 through, for example, units—product awards exchanges 2424.

Each of access platform 2406 and 2408 may be configured through open application programming interfaces (APIs), such as API plugins. An open API may be, for example, an API that is not specific to the technology of the entity to which access is provided. Typical product awards systems permit access using APIs that require the specific technology of one or more entities. For example, typical product awards systems may permit access to a merchant using an API that requires specific technology of the merchant, while permitting access to a product awards issuer using an API that requires specific technology of the product awards issuer. These specific technology APIs hinder integration of the entities within the product awards system. By contrast, open APIs do not require any specific technology, thereby improving integration of entities within system 2400.

In some embodiments, access platform 2406 may be implemented using one or more open APIs to the product awards issuers 2410. As another example, access platform 2408 may be implemented using one or more open APIs to the merchants 2414, currency markets 2416, and/or units markets 2418. Through open APIs, system 2400 may improve integration between product awards management system 2404 and product awards issuers 2410, merchants 2414, currency markets 2416, and/or units markets 2418. This integration may improve the functioning of system 2400 by, for example, minimizing inefficiency and lowering an operation cost of the system 2400. Moreover, such integration may streamline access by product awards management system 2404 to data collected by one or more of product awards issuers 2410, merchants 2414, currency markets 2416, and/or units markets 2418, thereby permitting real-time data collection for transactions. Further, such integration may enable system 2400 to support simultaneous transactions. For example, system 2400 may support simultaneous access by, for instance, a merchant 2414 and a product awards issuer 2406.

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments. For example, while a financial service provider and merchant have been referred to herein for ease of discussion, it is to be understood that consistent with disclosed embodiments other entities may provide such services in conjunction with or separate from a financial service provider and merchant.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

The invention claimed is:

1. A system for generating units according to at least one encryption technique associated with a blockchain, the system comprising:
a memory storing instructions; and
a processor configured to execute the instructions to perform operations comprising:
maintaining an account that comprises product awards for a plurality of product awards programs;
receiving transaction information describing a transaction;
based on the transaction information, determining one or more received product awards for the transaction in a product awards program in the plurality of product awards programs;
converting the received product awards into units using one of the encryption techniques of the blockchain, the converting being based on a real-time conversion rate determined based on one or more transactions included in the blockchain, wherein the real-time conversion rate is based on a real-time valuation of the received product awards, wherein the real-time valuation is evidenced by the one or more transactions included in the blockchain;
updating, based on the converting, the product awards account to reflect the units for the product awards program; and
entering into the blockchain data associated with the transaction that is encrypted according to the at least one encryption technique, wherein the encrypted data associated with the transaction includes at least the real-time valuation of the received product awards.

2. The system of claim 1, the operations further comprising providing to a computing device through an application a notification indicating the units converted from the received product awards.

3. The system of claim 1, the operations further comprising:
receiving a redemption transaction request to purchase an item of value associated with one of the product awards programs for a number of the units; and
redeeming the number of the units to fulfill the redemption transaction request by combining units from two or more of the plurality of product awards programs, and entering into the blockchain encrypted data associated with the redemption transaction, wherein the encrypted data is encrypted according to the at least one encryption technique.

4. The system of claim 3, the operations further comprising:
providing, based on the redemption transaction request, a redemption option indicating redeemable units; and
receiving a selection of the redemption option.

5. The system of claim 3, wherein:
the redemption transaction comprises a redemption of redeemable units in exchange for the item of value; and
the request indicates the item of value.

6. The system of claim 1, the operations further comprising:
receiving a request for an exchange transaction, wherein the request indicates offered units;
providing, based on the request, a real-time exchange option, wherein the real-time exchange option indicates an item of value available in exchange for the offered units;
receiving a selection of the real-time exchange option; and
in response to receiving the selection, exchanging in real-time the offered units for the item of value to conduct the exchange transaction and entering into the blockchain encrypted data associated with the exchange transaction, wherein the encrypted data is encrypted according to the at least one encryption technique.

7. The system of claim 6, wherein the encrypted data associated with the exchange transaction indicates at least one of a computing device, an entity providing the item of value, the offered units, or the item of value.

8. A method of generating units according to at least one encryption technique associated with a blockchain, comprising:
maintaining an account that comprises product awards for a plurality of product awards programs;
receiving transaction information describing a transaction;
based on the transaction information, determining one or more received product awards for the transaction in a product awards program in the plurality of product awards programs;
converting the received product awards into units using one of the encryption techniques of the blockchain, the converting being based on a real-time conversion rate determined based on one or more transactions included in the blockchain, wherein the real-time conversion rate_is based on a real-time valuation of the received product awards, wherein the real-time valuation is evidenced by the one or more transactions included in the blockchain;
updating, based on the converting, the product awards account to reflect the units for the product awards program; and
entering into the blockchain data associated with the transaction that is encrypted according to the at least one encryption technique, wherein the encrypted data associated with the transaction includes at least the real-time valuation of the received product awards.

9. The method of claim 8, further comprising providing to a computing device through an application a notification indicating the units converted from the received product awards.

10. The method of claim 8, further comprising:
receiving a redemption transaction request to purchase an item of value associated with one of the product awards programs for a number of the units; and
redeeming the number of the units to fulfill the redemption transaction request by combining units from two or more of the plurality of product awards programs, and entering into the blockchain encrypted data associated with the redemption transaction, wherein the encrypted data is encrypted according to the at least one encryption technique.

11. The method of claim 10, further comprising:
providing, based on the redemption transaction request, a redemption option indicating redeemable units; and
receiving a selection of the redemption option.

12. The method of claim 10, wherein:
the redemption transaction comprises a redemption of redeemable units in exchange for the item of value; and the request indicates the item of value.

13. The method of claim 8, further comprising:
receiving a request for an exchange transaction, wherein the request indicates offered units;
providing, based on the request, a real-time exchange option, wherein the real-time exchange option indicates an item of value available in exchange for the offered units;
receiving a selection of the real-time exchange option; and
in response to receiving the selection, exchanging in real-time the offered units for the item of value to conduct the exchange transaction and entering into the blockchain encrypted data associated with the exchange transaction, wherein the encrypted data is encrypted according to the at least one encryption technique.

14. The method of claim 13, wherein the encrypted data associated with the exchange transaction indicates at least one of a computing device, an entity providing the item of value, the offered units, or the item of value.

15. A computer readable medium storing instructions that, when executed by a processor, perform operations comprising:
maintaining an account that comprises product awards for a plurality of product awards programs;
receiving transaction information describing a transaction;
based on the transaction information, determining one or more received product awards for the transaction in a product awards program in the plurality of product awards programs;
converting the received product awards into units using one of the encryption techniques of the blockchain, the converting being based on a real-time conversion rate determined based one or more transactions included in the blockchain, wherein the real-time conversion rate_is based on a real-time valuation of the received product awards, wherein the real-time valuation is evidenced by the one or more transactions included in the blockchain;
updating, based on the converting, the product awards account to reflect the units for the product awards program; and
entering into the blockchain data associated with the transaction that is encrypted according to the at least one encryption technique, wherein the encrypted data associated with the transaction includes at least the real-time valuation of the received product awards.

16. The computer readable medium of claim 15, the operations further comprising providing to a computing device through an application a notification indicating the units converted from the received product awards.

17. The computer readable medium of claim 15, the operations further comprising:
receiving a redemption transaction request to purchase an item of value associated with one of the product awards programs for a number of the units; and
redeeming the number of the units to fulfill the redemption transaction request by combining units from two or more of the plurality of product awards programs, and entering into the blockchain encrypted data associated with the redemption transaction, wherein the encrypted data is encrypted according to the at least one encryption technique.

18. The computer readable medium of claim 17, the operations further comprising:
providing, based on the redemption transaction request, a redemption option indicating redeemable units; and
receiving a selection of the redemption option.

19. The computer readable medium of claim 17, wherein:
the redemption transaction comprises a redemption of redeemable units in exchange for the item of value; and
the request indicates the item of value.

20. The computer readable medium of claim 15, the operations further comprising:
receiving a request for an exchange transaction, wherein the request indicates offered units;
providing, based on the request, a real-time exchange option, wherein the real-time exchange option indicates an item of value available in exchange for the offered units;
receiving a selection of the real-time exchange option; and
in response to receiving the selection, exchanging in real-time the offered units for the item of value to conduct the exchange transaction and entering into the blockchain encrypted data associated with the exchange transaction, wherein the encrypted data is encrypted according to the at least one encryption technique.

21. The computer readable medium of claim 20, wherein the encrypted data associated with the exchange transaction indicates at least one of a computing device, an entity providing the item of value, the offered units, or the item of value.

* * * * *

UNITED STATES PATENT AND TRADEMARK OFFICE
CERTIFICATE OF CORRECTION

Page 1 of 1

PATENT NO. : 12,033,175 B2
APPLICATION NO. : 16/740772
DATED : July 9, 2024
INVENTOR(S) : Cassie Boutelle et al.

It is certified that error appears in the above-identified patent and that said Letters Patent is hereby corrected as shown below:

In the Claims

Claim 8, Column 30, Line 34, "rate_is" should read as --rate is--.

Claim 15, Column 31, Line 38, "rate_is" should read as --rate is--.

Signed and Sealed this
Seventh Day of January, 2025

Derrick Brent
*Acting Director of the United States Patent and Trademark Office*